United States Patent
He

(10) Patent No.: US 11,060,588 B2
(45) Date of Patent: Jul. 13, 2021

(54) ALL-GEAR CONTINUOUSLY VARIABLE AUTOMATIC TRANSMISSION AND SPEED RATIO ACTIVE CONTROL SYSTEM

(71) Applicant: Yaohua He, Hubei (CN)

(72) Inventor: Yaohua He, Hubei (CN)

( * ) Notice: Subject to any disclaimer, the term of this patent is extended or adjusted under 35 U.S.C. 154(b) by 0 days.

(21) Appl. No.: 17/033,689

(22) Filed: Sep. 26, 2020

(65) Prior Publication Data

US 2021/0079982 A1 Mar. 18, 2021

Related U.S. Application Data

(63) Continuation of application No. PCT/CN2019/109084, filed on Sep. 29, 2019.

(30) Foreign Application Priority Data

Sep. 12, 2019 (CN) .......................... 201910866255.9

(51) Int. Cl.
*F16H 3/72* (2006.01)
*F16H 37/08* (2006.01)
*F16H 48/08* (2006.01)

(52) U.S. Cl.
CPC ........... *F16H 3/724* (2013.01); *F16H 37/084* (2013.01); *F16H 48/08* (2013.01)

(58) Field of Classification Search
None
See application file for complete search history.

(56) References Cited

U.S. PATENT DOCUMENTS

| 3,204,476 A * | 9/1965 | Rouverol | F16H 37/084 475/159 |
| 4,696,205 A | 9/1987 | Marks | |
| 2008/0039265 A1* | 2/2008 | Nett | F16H 48/30 475/225 |
| 2018/0340595 A1* | 11/2018 | Nilsson | F16H 3/728 |

FOREIGN PATENT DOCUMENTS

| CN | 201170296 | 12/2008 |
| CN | 202914648 | 5/2013 |
| CN | 103335075 | 10/2013 |
| CN | 103775579 | 5/2014 |
| CN | 108136889 | 6/2018 |

* cited by examiner

*Primary Examiner* — Colby M Hansen
(74) *Attorney, Agent, or Firm* — JCIP Global Inc.

(57) ABSTRACT

An all-gear continuously variable automatic transmission and speed ratio active control system includes a speed ratio active control mechanism arranged between a torque proportional distribution differential mechanism and a planetary gear mechanism. The torque proportional distribution differential mechanism includes two differential bevel gears connected to a gear ring and a sun gear of the planetary gear mechanism respectively to be used as input shafts of the planetary gear mechanism. The speed ratio active control mechanism includes an adjustment motor, an adjustment driving gear and an adjustment driven gear. The adjustment driving gear and the adjustment driven gear are in a normally engaged state. The adjustment driven gear is rigidly connected to one of differential bevel gear shafts, and the adjustment driving gear is connected to the adjustment motor, and planetary gears are engaged with the sun gear and the gear ring respectively and output power.

15 Claims, 8 Drawing Sheets

(a)

(b)

(a)

(b)

(c)

(a)

(b)

(c)

ALL-GEAR CONTINUOUSLY VARIABLE AUTOMATIC TRANSMISSION AND SPEED RATIO ACTIVE CONTROL SYSTEM

CROSS-REFERENCE TO RELATED APPLICATION

This application is a continuation of international application of PCT application serial no. PCT/CN2019/109084 field on Sep. 29, 2019, which claims the priority benefit of China application no. 201910866255.9, filed on Sep. 12, 2019. The entirety of each of the above-mentioned patent applications is hereby incorporated by reference herein and made a part of this specification.

BACKGROUND

Technical Field

The present disclosure relates to the technical field of power transmission systems, in particular to an all-gear continuously variable automatic transmission power transmission system.

Description of Related Art

Power transmission systems (or devices) are the most basic and important part of all machines and are used for transmitting power from power sources (such as engines, steam turbines, water turbines or electric motors) to working mechanisms or working machines (such as driving wheels of various vehicles, propellers of ships, spindles/cutter heads of machine tools, rotary tillers, hydraulic pumps, compressors and blowers). Since the dynamic characteristics (such as the change of power and torque with the rotation speed) of the power sources are often quite different from the requirements of the working mechanisms or working machines, power transmission devices between the power sources and the working mechanisms or working machines need to have the function of speed reduction or speed change, which is why the transmission devices in many machines adopt speed reducers or transmissions (transmission devices with variable transmission ratios).

At present, transmissions adopted by various types of machines mainly include manual mechanical stepped transmissions (MT), electronically controlled mechanical stepped automatic transmissions (AMT), belt type continuously variable automatic transmissions (CVT), hydraulic automatic transmissions (AT), dual-clutch automatic transmissions (DCT) and the like. (1) The manual mechanical stepped transmissions (MT) have the defect that the number of gears of the transmissions (the number of steps of speeds) is limited and the most frequently used number of gears is 4-6, and mechanical stepped transmissions with the number of gears greater than 6 usually adopt a structure of main and auxiliary transmissions. For the mechanical stepped transmissions with 4-6 gears, the speed ratio between the gears have a large step difference, making it impossible for the power sources to always work in the high-efficiency area, and the speed ratio changes stepwise during the shift process, so that the power transmission characteristics of the transmissions are not ideal. For the main and auxiliary transmissions with the number of gears greater than 6, although the probability of the power sources working in the high-efficiency area is increased and the speed ratio gear difference between the gears is reduced, not only the problems of stepwise change of the gear ratio in the shift process and unsatisfactory power transmission characteristics still exist, but due to the increase in the number of gears, the shift operation is more complicated, and higher requirements are placed on the technical level of operators. (2) The electronically controlled mechanical stepped automatic transmissions (AMT) are an improved version of the manual mechanical stepped transmissions, variable speed transmission parts are almost the same as the original mechanical manual stepped transmissions, the only difference is that the shift operation is controlled by electronically controlled hydraulic or electronically controlled pneumatic actuators, the inherent defects of the original manual mechanical stepped transmissions, such as the large speed ratio step difference between gears, the stepwise change of the gear ratio in the shift process and the unsatisfactory power transmission characteristics all exist, but manual operation is not required for shifting. Since both the manual mechanical stepped transmissions (MT) and the electronically controlled mechanical stepped automatic transmissions (AMT) have the above many defects, people always want to replace mechanical stepped transmissions with continuously variable transmissions. (3) Driving and driven belt pulleys in the belt type continuously variable automatic transmissions (CVT) can realize automatic adjustment of the diameters, and torque converters in the hydraulic automatic transmissions (AT) have the function of continuously variable transmission, but the belt type continuously variable automatic transmissions and the hydraulic automatic transmissions have the common defects as follows. 1) The change range of the speed ratio is narrow, and the two types of transmissions often need to be used with another stepped mechanical transmission cooperatively to meet the requirements of various machines on the change range of the speed ratio. 2) The transmission efficiency is low and energy consumption is high. 3) The structure is complex and the manufacturing cost is high. 4) CVTs also have the effects that the torque transmission capability is very limited and high torque cannot be transmitted, and accordingly the CVTs are only used in small vehicles and small equipment. (4) The dual-clutch automatic transmissions (DCT) developed in recent years are actually also mechanical stepped automatic transmissions, and the biggest difference between the dual-clutch automatic transmissions (DCT) and the electronically controlled mechanical stepped automatic transmissions (AMT) is that each dual-clutch automatic transmission adopts two mechanical stepped transmissions in parallel for use, two clutches and an electronically controlled hydraulic or electronically controlled pneumatic or electronically controlled electric shift control mechanism are used for completing the shift operation, since two mechanical stepped transmissions are used, the number of gears of the transmission is increased, and the speed ratio step difference between gears is reduced. Since the two clutches cooperate in shift, the shift process is shortened, and shift abruptness is reduced. Even so, the dual-clutch automatic transmissions (DCT) are also mechanical stepped transmissions, so the defects of the speed ratio step difference between gears, the stepwise change of the gear ratio in the shift process and the unsatisfactory power transmission characteristics still exist, but the above-mentioned defects are somewhat reduced. In addition, because the structure and techniques of the dual-clutch automatic transmissions (DCT) are relatively complicated, the manufacturing cost is high, and the adaptability to the use environment is poor.

SUMMARY

The technical problem to be solved by the present disclosure is to completely overcome the defects of various transmissions in the prior art, and to provide an all-gear continuously variable automatic transmission and speed ratio active control system with simple structure, small size, low weight, high transmission efficiency and wide speed ratio change range, the torque transmission capacity can meet all mechanical transmission requirements, continuously variable automatic transmission is effectively achieved within the entire speed ratio change range, active control over the speed ratio can be achieved as well to meet various mechanical transmission needs.

To solve the above technical problems, the present disclosure adopts the following technical solutions.

An all-gear continuously variable automatic transmission and speed ratio active control system includes a torque proportional distribution differential mechanism, a speed ratio active control mechanism and a planetary gear mechanism. The torque proportional distribution differential mechanism is connected to the front end of the planetary gear mechanism in series to form a continuously variable automatic transmission device. The speed ratio active control mechanism is arranged between the torque proportional distribution differential mechanism and the planetary gear mechanism. The torque proportional distribution differential mechanism includes two differential bevel gears arranged at power and motion output ends, which are a first differential bevel gear and a second differential bevel gear. The first differential bevel gear is rigidly connected to a gear ring of the planetary gear mechanism by a hollow first differential bevel gear shaft. A second differential bevel gear shaft penetrates through the hollow first differential bevel gear shaft, and the second differential bevel gear is connected to a sun gear of the planetary gear mechanism by the second differential bevel gear shaft. The speed ratio active control mechanism includes a speed ratio adjustment motor, a speed ratio adjustment driving gear and a speed ratio adjustment driven gear. The speed ratio adjustment driving gear and the speed ratio adjustment driven gear are in a normally engaged state. The speed ratio adjustment driven gear is rigidly connected to the first differential bevel gear shaft. The speed ratio adjustment driving gear is installed on an output shaft of the speed ratio adjustment motor. The two input ends of the planetary gear mechanism are the sun gear at the center and the outermost gear ring respectively, and planetary gears are simultaneously engaged with the sun gear and the gear ring and output power by a planetary carrier.

Further, the torque proportional distribution differential mechanism includes a differential case, planetary bevel gears, the first differential bevel gear and the second differential bevel gear. A continuously variable automatic transmission device input shaft is rigidly connected to the differential case at a front end of the differential case. The first differential bevel gear and the second differential bevel gear are both rotatably supported in shaft holes extending in a front end-rear end direction or a left-right direction of the differential case. The second differential bevel gear and the first differential bevel gear are engaged with the planetary bevel gears at a front end and a rear end correspondingly. A front end of a first differential bevel gear shaft is rigidly connected to the first differential bevel gear. A front end of a second differential bevel gear shaft is rigidly connected to the second differential bevel gear. A rear end of the second differential bevel gear shaft penetrates through the hollow first differential bevel gear shaft and penetrates through the differential case and is rigidly connected to the sun gear or forms an integrated structure with a sun gear shaft.

Further, in the planetary gear mechanism, the planetary bevel gears are provided with circumferential annular grooves around the centerlines of planetary bevel gear shafts, one end of each planetary bevel gear shaft is fixedly installed on the differential case, and the other end of each planetary bevel gear shaft is installed in the corresponding annular groove by a bearing, and rotation centers of the planetary bevel gears during rotation are the center arc lines of the annular grooves.

Further, when the planetary bevel gears rotate, the distance between a first engaging point of each planetary bevel gear and the second differential bevel gear and the centerline of the corresponding planetary bevel gear shaft is set as S1, the distance between a second engaging point of each planetary bevel gear and the first differential bevel gear and the centerline of the corresponding planetary bevel gear shaft is set as S2, and the ratio of S1 to S2 is always a set ratio.

Further, at least two planetary bevel gears are adopted by the torque proportional distribution differential mechanism.

Further, at least two planetary gears are arranged in the planetary gear mechanism.

Further, two or more all-gear continuously variable automatic transmission and speed ratio active control systems are connected in series to widen the speed ratio change range of the all-gear continuously variable automatic transmission and speed ratio active control system; or in the planetary gear mechanism, a speed reduction mechanism is arranged in front of the sun gear to widen the speed ratio change range of the all-gear continuously variable automatic transmission and speed ratio active control system. The speed reduction mechanism is one of a symmetric fixed-shaft gear train gear reduction mechanism, an asymmetric fixed-shaft gear train gear reduction mechanism and a planetary gear reduction mechanism. The second differential bevel gear shaft is connected to the sun gear after being decelerated by the speed reduction mechanism. The speed reduction mechanism is connected in front of the sun gear in series.

Further, the front end or the rear end of the continuously variable automatic transmission device is connected to a reversing mechanism in series to achieve switching of at least three modes of forward rotation, reverse rotation and interruption of power and motion transmission. The reversing mechanism is a composite structure of a clutch and a synchronizer, or a duplex multi-plate clutch reversing mechanism, or a dual-clutch reversing mechanism.

Further, when the reversing mechanism integrating the clutch with the synchronizer is adopted, a clutch input shaft and a transmission input shaft are arranged in a straight line, an input shaft gear is arranged on the clutch input shaft, and the left end or the front end of the continuously variable transmission device input shaft is installed in a bearing seat hole at the right end of the input shaft gear by a bearing. A reversing driving gear is normally engaged with the input shaft gear, and also normally engaged with the front set of idle gears. The rear set of idle gears is coaxial with the front set of idle gears, and both the sets of idle gears are rigidly connected to an idle gear shaft. The rear set of idle gears is normally engaged with a reversing driven gear. The reversing driven gear hollowly sleeves the continuously variable automatic transmission device input shaft by a needle bearing or a sliding bearing. A lock ring or lock pin type synchronizer is installed between the input shaft gear and the reversing driven gear.

The clutch is one of a frictional diaphragm spring clutch, a frictional circumferential cylindrical helical spring clutch, a frictional central conical helical spring clutch, a multi-plate dry friction clutch, a multi-plate wet friction clutch and an electromagnetic clutch, and the clutch is operated in one of electronically controlled hydraulic mode, electrically controlled pneumatic mode, electrically controlled electromagnetic mode, electrically controlled servo motor and electrically controlled stepper motor.

Further, when the duplex multi-plate clutch reversing mechanism is adopted, an input shaft gear is arranged on a clutch input shaft, a reversing driven gear hollowly sleeves the continuously variable automatic transmission device input shaft by a needle bearing or a sliding bearing, and a duplex multi-plate clutch is installed between the input shaft gear and the reversing driven gear. The left end or the front end of the continuously variable automatic transmission device input shaft is installed in a bearing seat hole at the right end of the clutch input shaft gear by a bearing. A reversing driving gear is normally engaged with the input shaft gear, and also normally engaged with idle gears. The front and rear sets of idle gears are rigidly connected to an idle gear shaft. The idle gear at the rear end is normally engaged with the reversing driven gear.

The duplex multi-plate clutch adopts a dry duplex multi-plate clutch or a wet duplex multi-plate clutch. The duplex multi-plate clutch is operated in one of electronically controlled hydraulic mode, electrically controlled pneumatic mode and electrically controlled electromagnetic mode.

Further, when the dual-clutch reversing mechanism is adopted, the dual-clutch reversing mechanism is composed of two clutches and a planetary gear mechanism with a locking mechanism, and the two clutches are composed of a forward gear clutch and a reverse gear clutch. The forward gear clutch is rigidly connected to a reversing mechanism planetary carrier by a hollow forward gear input shaft. The reverse gear clutch is rigidly connected to a reversing mechanism sun gear by a reverse gear input shaft penetrating through the center of the forward gear input shaft, and a reversing mechanism gear ring and the left end or the front end of the continuously variable automatic transmission device input shaft are rigidly connected to transmit power and motion to the torque proportional distribution differential mechanism. A sun gear lock and a planetary carrier lock are installed on the reverse gear input shaft and the reversing mechanism planetary carrier respectively.

The two clutches adopt at least one of a frictional diaphragm spring clutch, a multi-plate dry friction clutch, a multi-plate wet friction clutch and an electromagnetic clutch. The clutches are operated in one of electronically controlled hydraulic mode, electrically controlled pneumatic mode, electrically controlled electromagnetic mode, electrically controlled servo motor and electrically controlled stepper motor.

Compared with the prior art, according to the all-gear continuously variable automatic transmission and speed ratio active control system of the present disclosure, the speed ratio active control mechanism is arranged between the torque proportional distribution differential mechanism and the planetary gear mechanism, the torque proportional distribution differential mechanism includes two differential bevel gears arranged at the power and motion output ends, and the two differential bevel gears are respectively connected to the gear ring and the sun gear of the planetary gear mechanism as input shafts of the planetary gear mechanism. The speed ratio active control mechanism includes a speed ratio adjustment motor, a speed ratio adjustment driving gear and a speed ratio adjustment driven gear, wherein the speed ratio adjustment driving gear and the speed ratio adjustment driven gear are in a normally engaged state. The speed ratio adjustment driven gear is rigidly connected to one of differential bevel gear shafts, and the speed ratio adjustment driving gear is connected with an output shaft of the speed ratio adjustment motor. The planetary gears are engaged with the sun gear and the gear ring simultaneously and output power to the outside through the planetary carrier. The speed ratio change range is wide, the torque transmission capacity can meet all mechanical transmission requirements, continuously variable automatic transmission is effectively achieved within the entire speed ratio change range, and active control over the speed ratio can be achieved as well to meet various mechanical transmission needs.

The present disclosure has the following beneficial effects.

(1) All transmission components of the all-gear continuously variable automatic transmission and speed ratio active control system are gears and shafts with quite high efficiency, so that the system has the same high efficiency as mechanical manual transmissions.

(2) The speed ratio change range is wide, and the requirements of various mechanical systems on the speed ratio change range can be met. In the planetary gear mechanism, the reduction mechanism is arranged in front of the sun gear to widen the speed ratio change range of the all-gear continuously variable automatic transmission and speed ratio active control system, or two or more continuously variable automatic transmission and speed ratio active control systems are connected in series for use, and thus a continuously variable automatic transmission and speed ratio active control system with the speed ratio change range of any size can be obtained. For example, when the speed ratio change range needs to be widened, the planetary gear mechanism with the reduction mechanism arranged in front of the sun gear is adopted, while the radial size of the gear ring is significantly reduced, the speed ratio change range of the all-gear continuously variable automatic transmission and speed ratio active control system can be widened. If the gear ratio α of the gear ring to the sun gear is reduced from 7 to 5, the continuously variable automatic transmission range is widened from the original 1 to 4 to 1.143 to 12, and the continuously variable automatic transmission range is greatly widened to nearly three times the original range.

(3) Continuously variable automatic transmission can be effectively achieved in the entire speed ratio change range.

(4) Not only can automatic continuously variable transmission be achieved, but also active control over the speed ratio can be achieved according to the actual needs in use.

(5) The torque transmission capacity is high, and the torque transmission capacity of the system is only related to the structure size, and thus the torque transmission capacity of the system can meet all mechanical transmission requirements.

(6) The structure and process are quite simple, manufacturing is easy, the production cost is low, and the usage environment adaptability is good.

(7) The size is small, and the weight is low.

The above many advantages of the "all-gear continuously variable automatic transmission and speed ratio active control system" of the present disclosure can completely overcome the defects of existing various transmissions and can meet various mechanical transmission needs.

DESCRIPTION OF THE EMBODIMENTS

Figure 1:
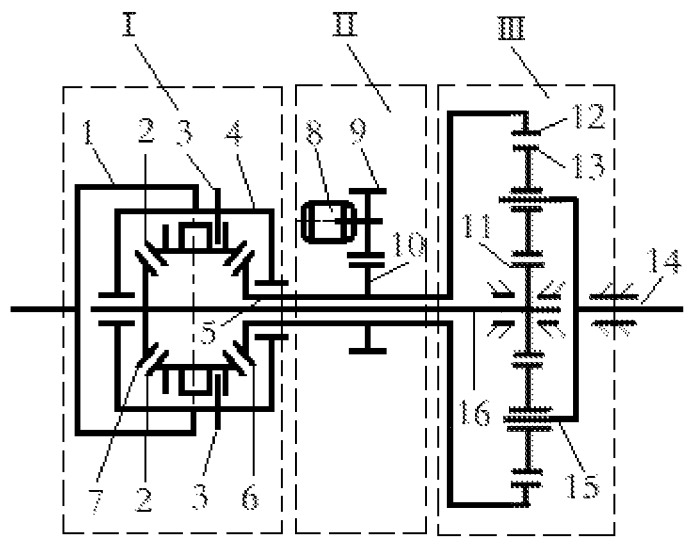
FIG. 1 is a structural schematic diagram of an all-gear continuously variable automatic transmission and speed ratio active control system of the present disclosure.

The specific structure of an all-gear continuously variable automatic transmission and speed ratio active control system implemented according to the present disclosure is shown in FIG. 1. The all-gear continuously variable automatic transmission and speed ratio active control system includes at least three parts which are connected in sequence: a torque proportional distribution differential mechanism I, a speed ratio active control mechanism II and a planetary gear mechanism III.

The torque proportional distribution differential mechanism I and the planetary gear mechanism III form a continuously variable automatic transmission device jointly. The torque proportional distribution differential mechanism I includes two differential bevel gears at the power and motion output ends. The two differential bevel gears include a first differential bevel gear 6 and a second differential bevel gear 7. The first differential bevel gear 6 is in key or splined connection to a gear ring 12 of the planetary gear mechanism III by a first differential bevel gear shaft 5. The second differential bevel gear 7 is in key or splined connection to a sun gear 11 of the planetary gear mechanism III by a second differential bevel gear shaft 16. The second differential bevel gear shaft 16 is used as a central shaft in the torque proportional distribution differential mechanism I and the speed ratio active control mechanism II. The second differential bevel gear shaft 16 penetrates through the hollow first differential bevel gear shaft 5 (with the same shaft axis but non-coaxial). The first differential bevel gear shaft 5 penetrates through the speed ratio active control mechanism II and extends to the torque proportional distribution differential mechanism I and the planetary gear mechanism III. On the basis of the continuously variable automatic transmission device, the speed ratio active control mechanism II is added to form a continuously variable automatic transmission device with speed ratio active control, as shown in FIG. 1, the functions of continuously variable automatic transmission and speed ratio active control can be achieved.

The structure of the planetary gear mechanism III is as follows.

In the continuously variable automatic transmission with active speed ratio control shown in FIG. 1, the planetary gear mechanism III is composed of a power output shaft 14, the second differential bevel gear shaft (or a sun gear shaft) 16, the sun gear 11, a planetary carrier 15, planetary gears 13 and the gear ring 12. The sun gear 11 and the gear ring 12 are two input ends of the planetary gear mechanism III, and power of the planetary gear mechanism III is output by the planetary carrier 15. The sun gear 11 is rigidly connected to the second differential bevel gear shaft (the sun gear shaft) 16 by a key or a spline, and the gear ring 12 is rigidly connected to the hollow first differential bevel gear shaft 5 by a key or spline. In the embodiment shown by FIG. 1, two planetary gears 13 are arranged. Based on the consideration of improving the torque transmission capacity of the planetary gear mechanism, a variety of different structural designs such as three planetary gears 13, four planetary gears 13, five planetary gears 13 or six planetary gears 13 can be adopted. Those skilled in the art can choose according to the usage requirements for the torque transmission capability.

The structure of the torque proportional distribution differential mechanism I is as follows.

As shown in FIG. 1, the torque proportional distribution differential mechanism I is connected to the front end of the planetary gear mechanism III in series, and includes a torque proportional distribution differential case 4. Outside the differential case 4, the front end of a continuously variable automatic transmission device input shaft 1 is rigidly connected to the differential case 4. Inside the differential case 4, the first differential bevel gear 6 and the second differential bevel gear 7 are supported in shaft holes extending in the front end-rear end direction of the differential case 4 by bearings. The second differential bevel gear 7 and the first differential bevel gear 6 are engaged with planetary bevel gears 2 at the front and rear ends respectively. The front end of the hollow first differential bevel gear shaft 5 is rigidly connected to the first differential bevel gear 6 by a key or a spline. The first differential bevel gear 6 is rigidly connected to the gear ring 12 of the planetary gear mechanism III by the first differential bevel gear shaft 5.

The second differential bevel gear shaft 16 (the sun gear shaft 16) penetrates through the hollow first differential bevel gear shaft 5, the front end of the second differential bevel gear shaft 16 is rigidly connected to the second differential bevel gear 7 by a key or a spline, and the rear end of the second differential bevel gear shaft 16 penetrates through the differential case 4 and is rigidly connected to the sun gear 11 by a key or a spline (the sun gear 11 may also be of an integrated structure with the sun gear shaft 16).

Figure 2:
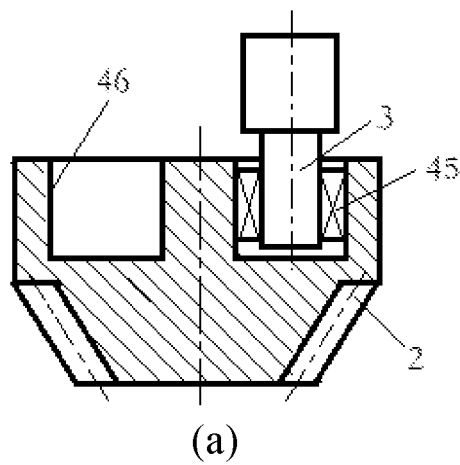
FIG. 2 is a structural schematic diagram of a planetary bevel gear.
Figure 2:
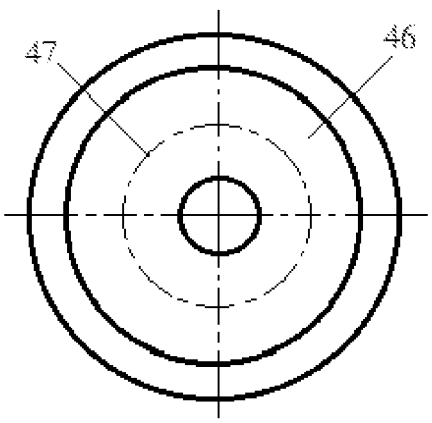

As shown in FIG. 2, each planetary bevel gear 2 is provided with an annular groove 46. One end of each planetary bevel gear shaft 3 is fixedly installed in a hole of the differential case 4 (as shown in FIG. 1, not shown in FIG. 2), and the other end of each planetary bevel gear shaft 3 is installed in the annular groove 46 of the corresponding planetary bevel gear 2 by a bearing 45 (which may be a cylindrical roller bearing, a needle bearing or a sliding bearing), as shown in part (a) of FIG. 2. When the planetary bevel gears 2 rotate, the rotation centers of the planetary bevel gears 2 are not the centerlines of the planetary bevel gears 2, but the center arc lines 47 of the annular grooves 46 (indicated by the dot dash line in (b) of FIG. 2). In order to achieve the effect that the differential distributes torque to the first differential bevel gear 6 and the second differential bevel gear 7 according to a set ratio, when the planetary bevel gears 2 rotate, a distance between a first engaging point A of each planetary bevel gear 2 and the second differential bevel gear 7 and the center line of the corresponding planetary bevel gear shaft 3 is set as S1, a distance between a second engaging point B of each planetary bevel gear 2 and the first differential bevel gear 6 and the center line of the corresponding planetary bevel gear shaft 3 is set as S2, and the ratio of S1 to S2 is always a set ratio (see FIG. 3). Based on the consideration of improving the torque transmission capacity of the differential, a variety of different structural designs such as two planetary bevel gears, three planetary bevel gears, four planetary bevel gears, five planetary bevel gears or six planetary bevel gears can be adopted, and those skilled in the art can make a match according to the torque load capacity.

The structure of the speed ratio active control mechanism is as follows.

The speed ratio active control mechanism II is composed of a speed ratio adjustment motor 8, a speed ratio adjustment driving gear 9 and a speed ratio adjustment driven gear 10. The speed ratio adjustment driven gear 10 is rigidly connected to the hollow first differential bevel gear shaft 5 by a key or a spline, the speed ratio adjustment driving gear 9 is fixedly installed on an output shaft of the speed ratio adjustment motor 8 by a key or a spline, and the speed ratio adjustment driving gear 9 and the speed ratio adjustment driven gear 10 are in a normally engaged state.

The structure of the reversing mechanism IV is as follows. In engineering, many working mechanisms or working machines often need to reversely operate during the work process, namely forward sometimes or reverse sometimes. There are two methods to achieve the forward rotation and reverse rotation of the mechanisms, namely: (1) enabling a power source to operate forward and reversely; and (2) adding a reversing mechanism to a transmission. Only power sources such as electric motors can implement the method (1), and it is difficult for most other types of power sources to implement the method (1).

Figure 4:
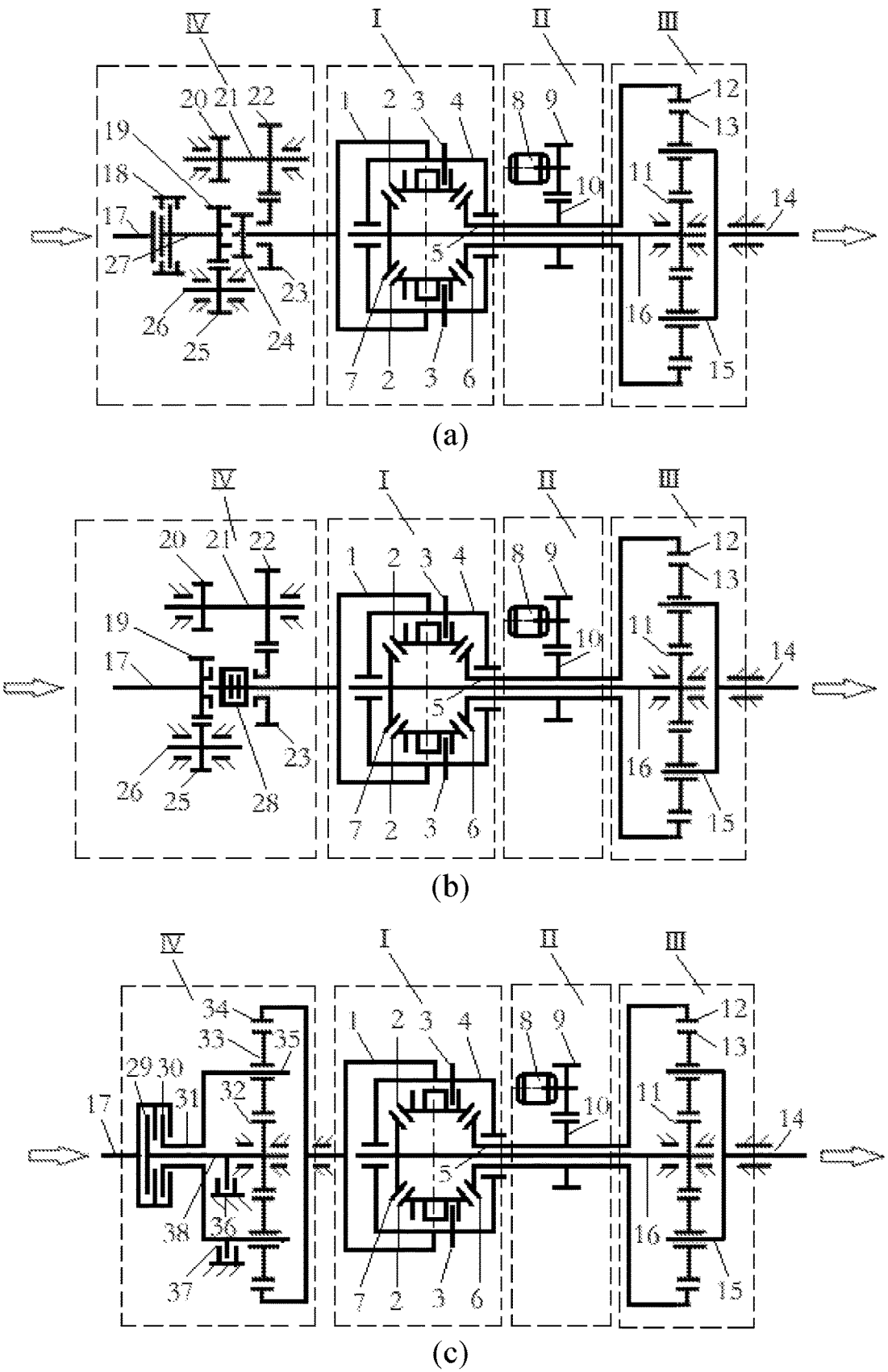
FIG. 4 is a structural schematic diagram of an all-gear continuously variable automatic transmission and speed ratio active control system with a reversing mechanism of the present disclosure.

As a preferred option, the all-gear continuously variable automatic transmission and speed ratio active control system of the present disclosure is additionally provided with the reversing mechanism IV. The reversing mechanism may adopt various different structure schemes such as a reversing mechanism with a clutch and a synchronizer (see (a) of FIG. 5) or a reversing mechanism with a duplex multi-plate clutch (see (b) of FIG. 5) or a dual-clutch reversing mechanism (see (c) of FIG. 5), which correspond to three implementation structures of the all-gear continuously variable automatic transmission and speed ratio active control system with the reversing mechanism shown in (a) to (c) of FIG. 4 respectively. Part (a) of FIG. 4 is a structural schematic diagram of a first implementation mode of the all-gear continuously variable automatic transmission and speed ratio active control system with the reversing mechanism of the present disclosure. Part (b) of FIG. 4 is a structural schematic diagram of a second implementation mode of the all-gear continuously variable automatic transmission and speed ratio active control system with the reversing mechanism of the present disclosure. Part (c) of FIG. 4 is a structural schematic diagram of a third implementation mode of the all-gear continuously variable automatic transmission and speed ratio active control system with the reversing mechanism of the present disclosure. In this way, the motion transmission direction can be easily changed, and the forward gear and the reverse gear can be switched. The reversing mechanism IV can be connected to the front end of the continuously variable automatic transmission device in series or to the rear end of the continuously variable automatic transmission device in series and used for achieving switching of three modes of forward rotation, reverse rotation and interruption of power and motion transmission.

The structure of an embodiment of the all-gear continuously variable automatic transmission and speed ratio active control system with the reversing mechanism composed of a clutch and a synchronizer is as follows.

Figure 5:
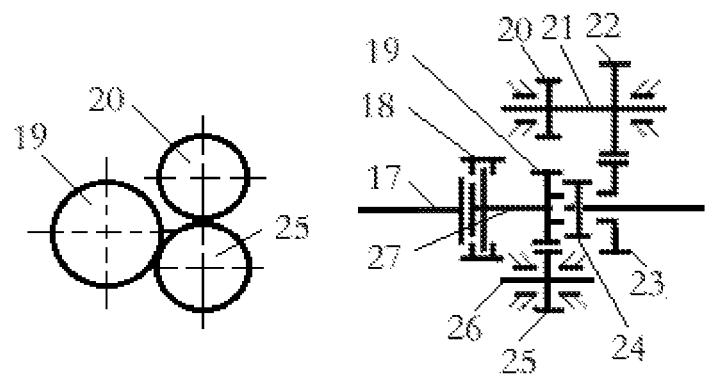
FIG. 5 is a structural schematic diagram of a reversing mechanism.
Figure 5:
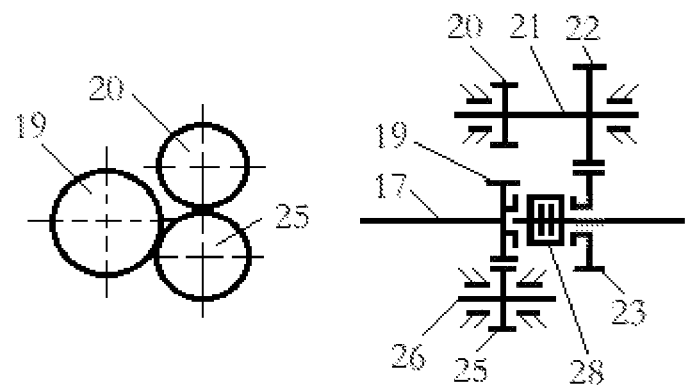
Figure 5:
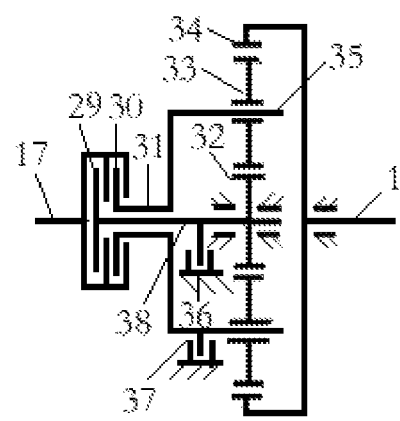

Referring to (a) of FIG. 4 and (a) of FIG. 5, the reversing mechanism IV composed of the clutch and the synchronizer consists of a clutch input shaft 17, a clutch 18, an input shaft gear 19, a reversing driving gear 25, a reversing driving gear shaft 26, a synchronizer 24, idle gears and a shaft (including idle gears 20 and 22, and the idle gear shaft 21), a reversing driven gear 23, a reversing input shaft 27 and the like, as shown in (a) of FIG. 4 and (a) of FIG. 5. The left drawing in (a) of FIG. 5 is a sectional view of the input shaft gear 19, the idle gear 20 and the reversing driving gear 25 in the direction perpendicular to the axial direction. In the right drawing in (a) of FIG. 5, the left end or front end of a continuously variable transmission device input shaft 1 is installed in a bearing seat hole at the right end of the input shaft gear 19 by a bearing. The reversing driving gear 25 is normally engaged with the input shaft gear 19, and also normally engaged with the idle gear 20. The idle gear 20 and the idle gear 22 are rigidly connected to the idle gear shaft 21 by a key or a spline. The idle gear 22 is normally engaged with the reversing driven gear 23. The reversing driven gear 23 hollowly sleeves the continuously variable automatic transmission device input shaft 1 through a needle bearing or a sliding bearing. The lock ring (or lock pin) type synchronizer 24 is installed between the input shaft gear 19 and the reversing driven gear 23. The function and working process of the reversing mechanism IV composed of the clutch and the synchronizer are as follows. Forward rotation (the rotation direction of the continuously variable automatic transmission device input shaft 1 is the same as the rotation direction of the clutch input shaft 17), reverse rotation (the rotation direction of the continuously variable automatic transmission device input shaft 1 is opposite to the rotation direction of the clutch input shaft 17) and the neutral gear of the reversing mechanism are switched by the synchronizer 24. When the reversing operation is required, the clutch 18 is disengaged at first, the synchronizer 24 is withdrawn from an original gear, and the clutch 18 is engaged after a to-be-engaged gear is engaged. When the synchronizer 24 is located in the middle position, the reversing mechanism interrupts power transmission, that is, the all-gear continuously variable automatic transmission and speed ratio active control system is in neutral. When the synchronizer 24 moves to the leftmost end, the reversing mechanism rotates forward. When the synchronizer 24 moves to the rightmost end, the reversing mechanism rotates reversely.

The clutch 18 in the all-gear continuously variable automatic transmission and speed ratio active control system of the present disclosure may be a frictional diaphragm spring clutch, a frictional circumferential cylindrical helical spring clutch, a frictional central conical helical spring clutch, a multi-plate dry friction clutch, a multi-plate wet friction clutch, an electromagnetic clutch or other different types of clutches. The clutch may be operated in the modes of electronically controlled hydraulic mode, electrically controlled pneumatic mode, electrically controlled electromagnetic mode, electrically controlled servo motor, electrically controlled stepper motor or other different operating modes.

The structure of an embodiment of the all-gear continuously variable automatic transmission and speed ratio active control system with a duplex multi-plate clutch reversing mechanism is as follows.

Referring to (b) of FIG. 4 and (b) of FIG. 5, the duplex multi-plate clutch reversing mechanism is composed of a duplex multi-plate clutch 28, a clutch input shaft 17, an input shaft gear 19, a reversing driving gear 25, a reversing driving gear shaft 26, idle gears and a shaft (including idle gears 20 and 22, and the idle gear shaft 21), a reversing driven gear 23 and the like, as shown in (b) of FIG. 5. The left drawing in (b) of FIG. 5 is a sectional view of the input shaft gear 19, the idle gear 20 and the reversing driving gear 25 in the direction perpendicular to the axial direction; in the right drawing in (b) of FIG. 5, the left end or front end of a continuously variable automatic transmission device input shaft 1 is installed in a bearing seat hole at the right end of the input shaft gear 19 by a bearing. The reversing driving gear 25 is normally engaged with the input shaft gear 19, and also normally engaged with the idle gear 20. The idle gear 20 and the idle gear 22 are rigidly connected to the idle gear shaft 21 by a key or a spline. The idle gear 22 is normally engaged with the reversing driven gear 23. The reversing driven gear 23 hollowly sleeves the continuously variable automatic transmission device input shaft 1 by a needle bearing or a sliding bearing. The duplex multi-plate clutch 28 is installed between the input shaft gear 19 and the reversing driven gear 23. The function and working process of the duplex multi-plate clutch reversing mechanism are as follows. Forward rotation (the rotation direction of the continuously variable automatic transmission device input shaft 1 is the same as the rotation direction of the clutch input shaft 17), reverse rotation (the rotation direction of the continuously variable automatic transmission device input shaft 1 is opposite to the rotation direction of the clutch input shaft 17) and the neutral gear of the reversing mechanism are switched by the duplex multi-plate clutch 28. When a left clutch is engaged and a right clutch is disengaged in the duplex multi-plate clutch 28, the reversing mechanism rotates forward. When the right clutch is engaged and the left clutch is disengaged in the duplex multi-plate clutch, the reversing mechanism rotates reversely. When the left and right clutches of the duplex multi-plate clutch are both disengaged, the reversing mechanism interrupts power transmission, that is, the all-gear continuously variable automatic transmission device is in neutral.

The duplex multi-plate clutch 28 in the all-gear continuously variable automatic transmission and speed ratio active control system of the present disclosure may be a dry duplex multi-plate clutch or a wet duplex multi-plate clutch. The duplex multi-plate clutch may be operated in the modes of electronically controlled hydraulic mode, electrically controlled pneumatic mode, electrically controlled electromagnetic mode or other different operating modes.

The structure of an embodiment of the all-gear continuously variable automatic transmission and speed ratio active control system with a dual-clutch reversing mechanism is shown in (c) of FIG. 4 and (c) of FIG. 5.

The dual-clutch reversing mechanism is composed of two clutches and a planetary gear mechanism with a locking mechanism. The specific structure is as follows. A forward gear clutch 30 of the two clutches is rigidly connected to a reversing mechanism planetary carrier 35 by a hollow forward gear input shaft 31. A reverse gear clutch 29 of the two clutches is rigidly connected to a reversing mechanism sun gear 32 by a reverse gear input shaft 38 penetrating through the center of the forward gear input shaft 31, and a reversing mechanism gear ring 34 and the left end or the front end of the continuously variable automatic transmission device input shaft 1 are rigidly connected to transmit power and motion to the torque proportional distribution differential mechanism I. In order to achieve free switching between the forward gear and the reverse gear, a sun gear lock 36 and a planetary carrier lock 37 are installed on the reverse gear input shaft 38 and the reversing mechanism planetary carrier 35 respectively. The function and working process of the dual-clutch reversing mechanism are as follows. Forward rotation (the rotation direction of the continuously variable automatic transmission device input shaft 1 is the same as the rotation direction of a dual-clutch input shaft 17), reverse rotation (the rotation direction of the continuously variable automatic transmission device input shaft 1 is opposite to the rotation direction of the dual-clutch input shaft 17) and the neutral gear of the reversing mechanism are switched by alternate engaging and disengaging of the two clutches 29 and 30. If the forward gear clutch 30 is engaged and the reverse gear clutch 29 is disengaged, while the sun gear lock 36 is locked and the planetary carrier lock 37 is unlocked, power and motion are transmitted to the continuously variable automatic transmission device input shaft 1 through the forward gear clutch 30, the forward gear input shaft 31, the reversing mechanism planetary carrier 35, a reversing mechanism planetary gear 33 and the reversing mechanism gear ring 34. The rotation direction of the continuously variable automatic transmission device input shaft 1 is the same as the rotation direction of the clutch input shaft 17, so that the reversing mechanism rotates forward. If the reverse gear clutch 29 is engaged and the forward gear clutch 30 is disengaged, while the planetary carrier lock 37 is locked and the sun gear lock 36 is unlocked, power and motion are transmitted to the continuously variable automatic transmission device input shaft 1 through the reverse gear clutch 29, the reverse gear input shaft 38, the reversing mechanism sun gear 32, the reversing mechanism planetary gear 33 and the reversing mechanism gear ring 34. The rotation direction of the continuously variable automatic transmission device input shaft 1 is opposite to the rotation direction of the clutch input shaft 17, so that the reversing mechanism rotates reversely. When the forward gear clutch and the reverse gear clutch are both disengaged, the reversing mechanism interrupts power transmission, that is, the all-gear continuously variable automatic transmission device is in neutral.

The two clutches (the forward gear clutch 30 and the reverse gear clutch 29) in the all-gear continuously variable automatic transmission and speed ratio active control system of the present disclosure may be a frictional diaphragm spring clutch, a multi-plate dry friction clutch, a multi-plate wet friction clutch, an electromagnetic clutch or other different types of clutches. The clutches may be operated in the modes of electronically controlled hydraulic mode, electrically controlled pneumatic mode, electrically controlled electromagnetic mode, electrically controlled servo motor, electrically controlled stepper motor or other different operating modes.

Introduction of the all-gear continuously variable automatic transmission principle of the present disclosure.

The continuously variable automatic transmission principle of the all-gear continuously variable automatic transmission and speed ratio active control system of the present disclosure is as follows.

A planetary gear mechanism is composed of four major components of a sun gear, a planetary gear, a planetary carrier and a gear ring and is a typical two-degree-of-freedom mechanism, wherein the three components of the sun gear, the planetary carrier and the gear ring can be used as power and motion input ends and can also be used as power and motion output ends. In this way, the planetary gear mechanism has the following three different transmission schemes, namely: (1) two power input ends and one power output end; (2) one power input end and two power output ends; and (3) one power input end, one power output end and one fixed end.

Planetary gear mechanism with two power input ends and one power output end is described below.

Only when any two of the three power and motion input/output components of the planetary gear mechanism have definite motion input (including zero input), the other component has definite motion output, the motion output changes with the motion of any one of the two motion input ends, and the principle formula is as follows.

$$n_T + \alpha n_Q - (1+\alpha) n_H = 0 \tag{1}$$

Wherein, $n_T$, $n_H$ and $n_Q$ represent the rotation speeds of a sun gear T, a planetary carrier H and a gear ring Q correspondingly.

$\alpha$ represents the gear ratio of the gear ring to the sun gear with the formula:

$$\alpha = \frac{Z_Q}{Z_T}.$$

$Z_T$ and $Z_Q$ represent the numbers of teeth of the sun gear T and the gear ring Q.

1. If the sun gear and the gear ring are used as the two motion input ends of the planetary gear mechanism, and the planetary carrier is used as the motion output end of the planetary gear mechanism (the planetary gear mechanism III in the present disclosure is of this type), whether the motion of either the sun gear or the gear ring changes, the motion of the planetary carrier as the output end changes accordingly. There are two cases of definite motion at the input ends as follows.

1) The rotation speed of one of the two input ends is zero, and the rotation speed of the other input end changes freely. In this case, there are two different modes, which are $n_Q=0$, $n_T$ changes freely or $n_T=0$, $n_Q$ changes freely.

(1) ($n_Q=0$, $n_T$ changes freely) is substituted into the formula (1) to obtain:

$$n_T + \alpha \times 0 - (1+\alpha) n_H = 0 \implies i_{TH} = \frac{n_T}{n_H} = 1+\alpha \tag{2}$$

Wherein, $i_{TH}$ is the speed ratio where the sun gear is the motion input end, the gear ring is the fixed end, and the planetary carrier is the motion output end.

(2) ($n_T=0$, $n_Q$ changes freely) is substituted into the formula (1) to obtain:

$$0 + \alpha n_Q - (1+\alpha) n_H = 0 \implies i_{QH} = \frac{n_Q}{n_H} = 1 + \frac{1}{\alpha} \tag{3}$$

Wherein, $i_{QH}$ is the speed ratio where the gear ring is the motion input end, the sun gear is the fixed end, and the planetary carrier is the motion output end.

For the planetary gear mechanism, the number of teeth $Z_Q$ of the gear ring must be greater than the number of teeth $Z_T$ of the sun gear, that is, $\alpha>1$, so:

$$i_{TH} > i_{QH} \tag{4}$$

2) The rotation speeds of the two input ends are the same and both are n ($n_T=n_Q=n_i=n$), the rotation speed of the planetary carrier must also be equal to the rotation speeds of the sun gear and the gear ring at this time, that is, $n_H=n_Q=n_T=n$, and $n_H=n_Q=n_T=n$ is substituted into the formula (1) to obtain:

$$n_T + \alpha n_Q - (1+\alpha) n_H = 0 \implies i_{TH} = \frac{n_T}{n_H} = 1 \tag{5}$$

$$i_{QH} = \frac{n_Q}{n_H} = 1 \tag{6}$$

The conclusions are drawn by comparing formulas (2), (3), (4), (5) and (6). (1) The planetary gear mechanism may have three fixed speed ratios (also known as transmission ratios), namely, $$i_{TH} = \frac{n_T}{n_H} = 1+\alpha, \ i_{QH} = \frac{n_Q}{n_H} = 1+\frac{1}{\alpha}, \ i_{TH} = 1 \text{ and} \tag{2}$$

$$i_{QH} = 1.$$

The gear ratio of the gear ring to the sun gear must be greater than 1 ($\alpha>1$), so the maximum transmission ratio of the planetary gear mechanism is $$i_{TH} = \frac{n_T}{n_H} = 1+\alpha,$$

and the minimum transmission ratio is $i_{TH}=1$. (3) Assume the input end of the planetary gear mechanism is the sun gear and the output end is the planetary carrier, if the rotation speed $n_Q$ of the gear ring continuously changes within the range of 0 and $n_T$, then the speed ratio of the planetary gear mechanism continuously changes between the maximum speed ratio $$i_{TH} = \frac{n_T}{n_H} = 1+\alpha$$

and the minimum speed ratio $i_{TH}=1$. Assume the input end of the planetary gear mechanism is the gear ring and the output end is the planetary carrier, if the rotation speed $n_T$ of the sun gear continuously changes within the range of 0 and $n_Q$, the speed ratio of the planetary gear mechanism continuously changes between $$i_{QH} = \frac{n_Q}{n_H} = 1+\frac{1}{\alpha}$$

and the minimum speed ratio $i_{QH}=1$. It can be seen that if the power and motion are input by the sun gear and output by the planetary carrier, as long as the gear ring can continuously adjust the rotation speed within the range of 0 and $n_T$, the speed ratio of the planetary gear mechanism can continuously change between the maximum speed ratio $$i_{TH} = \frac{n_T}{n_H} = 1+\alpha$$

and the minimum speed ratio $i_{TH}=1$, and thus continuously variable transmission is achieved; and if the power and motion are input by the gear ring and output by the planetary carrier, as long as the sun gear can continuously adjust the rotation speed within the range of 0 and $n_Q$, the speed ratio of the planetary gear mechanism can continuously change between $$i_{QH} = \frac{n_Q}{n_H} = 1 + \frac{1}{\alpha}$$

and $i_{QH}=1$, and thus continuously variable transmission can also be achieved. Since the number of teeth of the gear ring must be greater than the number of teeth of the sun gear, that is, $$\alpha = \frac{z_Q}{z_T} > 1,$$

therefore, the speed ratio change range which can be reached by adjusting the rotation speed of the gear ring during input by the sun gear is wider than the speed ratio change range which can be reached by adjusting the rotation speed of the sun gear during input by the gear ring. For example, if the gear ratio of the gear ring to the sun gear is $\alpha=4$, the speed ratio change range which can be reached by adjusting the rotation speed of the gear ring during sun gear input is $i_{TH}=1-5$ (the maximum speed ratio $i_{TH}=1+\alpha=1+4=5$); and the speed ratio change range which can be reached by adjusting the rotation speed of the sun gear during input by the gear ring is $i_{QH}=1-1.25$ (the maximum speed ratio $$i_{QH} = 1 + \frac{1}{\alpha} = 1 + \frac{1}{4} = 1.25\Big).$$

It can be seen that for the same planetary gear mechanism, input by the sun gear has a significant advantage of the wide speed ratio change range by adjusting the rotation speed of the gear ring. But for all kinds of mechanical systems that require power drive (such as driving wheels of various vehicles, propellers of ships, spindles/cutter heads of machine tools, rotary tillers, hydraulic pumps, compressors and blowers), there is not only one power source in most cases, but more importantly. The reason why various mechanical systems that require power drive need variable speed transmission is that the dynamic characteristics (such as the change of power and torque with the rotation speed) of the power sources are often quite different from the requirements of working mechanisms or working machines, and it is necessary to use variable speed transmissions to cover the shortage, that is, to achieve the continuously variable transmission characteristic of the planetary gear mechanism, it is necessary to adopt a second power source which can adjust the own speed conveniently.

2. If the sun gear and the planetary carrier are the two motion input ends of the planetary gear mechanism, and the gear ring is the motion output end of the planetary gear mechanism, whether the motion of either the sun gear or the planetary carrier changes, the motion of the gear ring as the output end changes accordingly. There are two cases of definite motion at the input ends as below.

1) The rotation speed of one of the two input ends is zero, and the speed of the other input end changes freely. In this case, there are two different modes, which are $n_H=0$, $n_T$ changes freely or $n_T=0$, $n_H$ changes freely.

(1) ($n_H=0$, $n_T$ changes freely) is substituted into the formula (1) to obtain:

$$\frac{n_T}{n_Q} = -\alpha \Longrightarrow i_{TQ} = \frac{n_T}{n_Q} = -\alpha \quad (7)$$

Wherein, $i_{TQ}$ is the speed ratio where the sun gear is the motion input end, the planetary carrier is the fixed end, and the gear ring is the motion output end, and "-" in front of $$\frac{z_Q}{z_T}$$

means that the direction of the rotation speed of the gear ring being the output end is opposite to that of the rotation speed of the input end sun gear.

(2) ($n_T=0$, $n_H$ changes freely) is substituted into the formula (1) to obtain:

$$\frac{n_H}{n_Q} = \frac{\alpha}{1+\alpha} \Longrightarrow i_{HQ} = \frac{n_H}{n_Q} = \frac{1}{1+\alpha} < 1 \quad (8)$$

Wherein, $i_{HQ}$ is the speed ratio where the planetary carrier is the motion input end, the sun gear is the fixed end, and the gear ring is the motion output end.

2) The rotation speeds of the two input ends are the same and both are $n_i$ ($n_T=n_Q=n_i=n$), the rotation speed of the planetary carrier must also be equal to the rotation speeds of the sun gear and the gear ring at this time, that is, $n_Q=n_Q=n_T=n$ is substituted into the formula (1) to obtain:

$$n_T + \alpha n_Q - (1+\alpha)n_H = 0 \Longrightarrow i_{TQ} = \frac{n_T}{n_Q} = 1 \quad (9)$$

$$i_{HQ} = \frac{n_H}{n_Q} = 1 \quad (10)$$

The conclusions are drawn by comparing formulas (7), (8), (9) and (10). (1) The planetary gear mechanism may have three fixed speed ratios (also known as transmission ratios), namely, $$i_{TQ} = \frac{n_T}{n_Q} = -\alpha, \quad (2)$$

$$i_{HQ} = \frac{n_H}{n_Q} = \frac{\alpha}{1+\alpha},$$

$$i_{TQ} = 1 \text{ and } i_{HQ} = 1.$$

The maximum transmission ratio of the planetary gear mechanism is $$i_{TQ} = \frac{n_T}{n_Q} = -\alpha,$$

and the minimum transmission ratio is $$i_{HQ} = \frac{\alpha}{1+\alpha}. \quad (3)$$

Assume the input end of the planetary gear mechanism is the sun gear and the output end is the gear ring, if the rotation speed $n_H$ of the planetary carrier continuously changes within the range of 0 and $n_T$, the speed ratio of the planetary gear mechanism continuously changes between the maximum speed ratio $$i_{TQ} = \frac{n_T}{n_Q} = -\alpha$$

and $i_{TQ}=1$ accordingly. Also, assume the input end of the planetary gear mechanism is the planetary carrier and the output end is the gear ring, if the rotation speed $n_T$ of the sun gear continuously changes within the range of 0 and $n_H$, the speed ratio of the planetary gear mechanism continuously changes between $$i_{HQ} = \frac{\alpha}{1+\alpha}$$

and $i_{HQ}=1$ accordingly. It can be seen that if the power is input from the sun gear and output by the gear ring, as long as the planetary carrier can continuously adjust the own rotation speed within the range of 0 and $n_T$, the speed ratio of the planetary gear mechanism can continuously change between the maximum speed ratio $$i_{TQ} = \frac{n_T}{n_Q} = -\alpha$$

and $i_{TQ}=1$, but this change in speed ratio does not fully meet the requirements of a mechanical transmission system, because the rotation direction of the speed output end changes during the speed changing process; and if the power is input from the planetary carrier and output by the gear ring, as long as the sun gear can continuously adjust the own rotation speed within the range of 0 and $n_H$, the speed ratio of the planetary gear mechanism can continuously change between $$i_{HQ} = \frac{\alpha}{1+\alpha}$$

and $i_{HQ}=1$, but the speed ratio change range is very limited. This shows that although the planetary gear mechanism with the sun gear and the planetary carrier as the two motion input ends of the planetary gear mechanism and the gear ring as the motion output end of the planetary gear mechanism can also achieve continuously variable transmission, due to the above serious shortcomings and the fact that a second power source which can adjust the speed conveniently must be provided to achieve the continuously variable transmission characteristic, this is obviously not only unachievable but also has no use value.

Planetary gear mechanism with one power input end and two power output ends is described below.

If the power is input from any one of the three components of the planetary gear mechanism (for example, the planetary carrier) and the power is output from the other two components (for example, the gear ring and the sun gear), the two power output ends can output the power at various rotation speeds, and this is how the planetary gear mechanism can be used as a differential.

From the previous analysis, if a user wants to achieve continuously variable transmission through the planetary gear mechanism, the following is necessary. (1) The scheme with the sun gear and the gear ring being the two input ends, and the planetary carrier being the output end has a significant advantage of a wide speed ratio change range, the maximum transmission ratio is 1+α, and the minimum transmission ratio is 1. (2) There must be two powers available for input.

Figure 3:
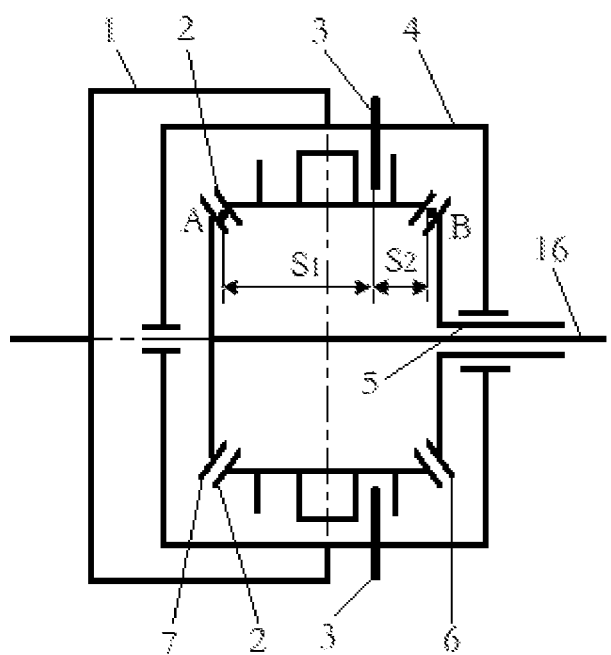
FIG. 3 is a structural schematic diagram of a torque proportional distribution differential mechanism.

For various power mechanical systems that require variable speed transmission, there is only one power source in most cases. However, in order to achieve continuously variable transmission through the planetary gear mechanism, there must be two powers available for input. To solve the problem, a differential is likely to be considered, but so far there has not been any differential that can meet the requirements of the present disclosure, because of the following reasons. (1) Although a symmetrical planetary gear differential has the obvious advantage of high transmission efficiency, since two output ends can only output torque of equal value, it can be seen from the previous analysis that a planetary gear mechanism with a sun gear and a gear ring being two input ends and a planetary carrier being an output end is more applicable to achieving continuously variable transmission, the torque of the gear ring being the input end of the planetary gear mechanism should be α times the torque at the sun gear being the input end (namely $M_Q=\alpha M_T$, α represents the gear ratio of the gear ring to the sun gear, and MQ and MT are input torques of the gear ring end and the sun gear end respectively), since the torques of the two output ends of the symmetrical planetary gear differential do not match the torques of the sun gear and the gear ring being the two input ends in the planetary gear mechanism III at all, the symmetrical planetary gear differential cannot meet the requirements of the present disclosure. (2) Although a Torsen differential and a helical toothed limited slip differential have the function of outputting two unequal torques, both the differentials output unequal torques by adopting a method of increasing internal friction (such as adopting worm gears with large friction torques or helical gears with large helix angles), then the Torsen differential and the helical toothed limited slip differential have low transmission efficiency, and the torque difference between the two output ends is very limited, and thus the Torsen differential and the helical toothed limited slip differential cannot meet the application requirements of the present disclosure as well. In order to effectively solve the problem, a specific torque proportional distribution differential mechanism I (as shown in FIGS. 1-3) is specifically invented according to the present disclosure, the power of a single power source is divided into two powers for external output according to a set ratio, and the ratio is the gear ratio α of a gear ring to a sun gear in the planetary gear mechanism III. The torque proportional distribution differential mechanism I is connected to the front end of the planetary gear mechanism III in series to form the continuously variable automatic transmission device of the present disclosure, and the specific principle of continuously variable automatic transmission is as follows.

1) Since planetary bevel gears 2 in the torque proportional distribution differential mechanism I do not rotate about fixed axes, but rotate around annular groove center arc lines as shown in FIG. 2, the distance S1 between the first engaging point A of each planetary bevel gear 2 and a second differential bevel gear 7 and a planetary bevel gear shaft 3 and the distance S2 between the second engaging point B of each planetary bevel gear 2 and a first differential bevel gear 6 and the planetary bevel gear shaft 3 are not equal. If engaging force of the second differential bevel gear 7 acting on the planetary bevel gear 2 is $F_1$ (the engaging force at the point A), and engaging force of the first differential bevel gear 6 acting on each planetary bevel gear 2 is $F_2$ (the engaging force at the point B). Moments acting on the planetary bevel gears 2 should be balanced, namely:

$$F_1 S_1 = F_2 S_2$$

Then:

$$F_2 = \frac{S_1}{S_2} F_1 \tag{11}$$

If the engaging force of the corresponding planetary bevel gear 2 acting on the second differential bevel gear 7 is $F'_1$, the engaging force of the corresponding planetary bevel gear 2 acting on the first differential bevel gear 6 is $F'_2$, according to the principle of acting force and reacting force, then:

$$F'_1 = F_1, F'_2 = F_2$$

Since the numbers of teeth and the moduli of the first differential bevel gear 6 and the second differential bevel gear 7 are equal, the diameters of reference circles of the first differential bevel gear 6 and the second differential bevel gear 7 must be equal. If the diameters of the reference circles of the first differential bevel gear 6 and the second differential bevel gear 7 are R, the torques M6 and M7 output by the differential bevel gears 6 and 7 are:

$$M_6 = FF'_2 = FF_2 = \frac{S_1}{S_2} FF_1 \tag{12}$$

$$M_7 = FF'_1 = FF_1 \tag{13}$$

The formulas (12) and (13) are compared to obtain:

$$M_6 = \frac{S_1}{S_2} M_7 \tag{14}$$

If $$\frac{S_1}{S_2}$$

is exactly equal to the gear ratio $\alpha$ of the gear ring to the sun gear in the planetary gear mechanism III, the requirement that the torque $M_Q$ of the gear ring in the planetary gear mechanism III is $\alpha$ times the torque of the sun gear $M_T$, that is:

$$M_Q = \alpha M_T \tag{15}$$

In this way, the torque balance can be achieved between the torque proportional distribution differential mechanism I and the planetary gear mechanism III, that is, the torque effective transmission relationship is completely satisfied.

If the input rotation speed of the torque proportional distribution differential mechanism I is $n_i = n$, the gear ratio $\alpha$ of the gear ring to the sun gear in the planetary gear mechanism III is $$\alpha = \frac{S_1}{S_2} = 7,$$

the rotation speeds of the first differential bevel gear 6 and the second differential bevel gear 7 are $n_6$ and $n_7$ respectively, the rotation speeds of the gear ring to the sun gear in the planetary gear mechanism III are $n_Q$ and $n_T$ respectively, since the first differential bevel gear 6 and the second differential bevel gear 7 are rigidly connected to the gear ring 12 and the sun gear 11 in the planetary gear mechanism III through respective shafts correspondingly, namely:

$$n_Q = n_6 \tag{16}$$

$$n_T = n_7 \tag{17}$$

Knowing from the principle of differentials, the input rotation speed $n_i$ of a differential mechanism and the output rotation speeds of the two differential bevel gears, namely the first differential bevel gear 6 and the second differential bevel gear 7 always satisfy the following relational expression:

$$n_6 + n_7 = 2n_i \tag{18}$$

Wherein, $n_i$ is the differential input rotation speed, and $n_i = n$.

$n_6$ and $n_7$ are the rotation speeds of the first differential bevel gear 6 and the second differential bevel gear 7 respectively.

When $n_6 = 0$, from formulas (17), (18) and (19), the following equations are obtained.

$$n_Q = n_6 = 0$$

$$n_T = n_7 = 2n$$

$n_Q = 0$, $n_T = 2n$ and $\alpha = 7$ are substituted into formula (1) to calculate the output rotation speed $n_H$ of the continuously variable automatic transmission device:

$$2n + \alpha \times 0 - (1+\alpha) n_H = 0$$

$$n_H = \tfrac{1}{4} n$$

The maximum speed ratio $i_{max}$ (also called transmission ratio) of the continuously variable automatic transmission device is:

$$i_{max} = \frac{n_i}{n_H} = \frac{n}{\frac{1}{4}n} = 4$$

When $n_6 = n$, from formulas (16), (17) and (18), the following equations are obtained.

$$n_Q = n_6 = n$$

$$n_T = n_7 = n$$

$n_Q = n$, $n_T = n$ and $\alpha = 7$ are substituted into formula (1) to calculate the output rotation speed $n_H$ of the continuously variable automatic transmission device:

$$n+7\times n-(1+7)n_H=0$$

$$n_H=n$$

The minimum speed ratio $i_{min}$ of the continuously variable automatic transmission device is:

$$i_{min} = \frac{n_i}{n_H} = \frac{n}{n} = 1$$

It can be seen from the previous calculations that if the rotation speed of the gear ring 12 continuously changes from 0 to n, the speed ratio of the continuously variable automatic transmission device can be continuously changed from 4 to 1, that is, continuously variable automatic transmission can be achieved.

In the field of motor vehicles (a general term for automobiles, tractors, tanks and walkable construction machinery), a gear with a transmission reduction ratio (also known as transmission ratio) of 1 is called a direct gear. In order to improve the fuel economy of motor vehicles, many motor vehicle transmissions are equipped with overgears (gears with a reduction ratio of less than 1). The all-gear continuously variable automatic transmission and speed ratio active control system of the present disclosure can be provided with overgears of any reduction ratio without making any changes to a system structure, but also can achieve continuously variable automatic transmission in the entire speed ratio change range (from the overgear with the minimum speed ratio to the maximum speed ratio). A specific implementation method is that: the rotation speed of a speed ratio adjustment motor 8 is increased, then the rotation speed $n_Q$ transmitted to the gear ring 12 of the planetary gear mechanism III through a speed ratio adjustment driving gear 9 and a speed ratio adjustment driven gear 10 is greater than the rotation speed $n_T$ of the sun gear 11 (that is $n_Q > n_T$), and thus a required overgear reduction ratio can be reached. Taking the example α=7 mentioned above as an example, if the input rotation speed of the differential is $n_i=n$, $n_Q=n_6=1.5n$ and $n_T=n_7$ are substituted into the formula (18) to obtain $n_T=0.5n$. Assume the rotation speed of the planetary carrier in this state is $n_{H0.5}$ and the reduction ratio of the continuously variable automatic transmission device is $i_{0.5}$, and the relevant parameters are substituted into the formula (1) to obtain $n_{H0.5}=1.375n$ and $$i_{0.5} = \frac{n}{n_{H0.5}} = \frac{n}{1.375n} = 0.7273.$$

If $n_Q=1.2n$, $n_{H0.5}=1.15n$ and $i_{0.5}=0.8696$ can be obtained through calculations. The calculation results show that as long as the rotation speed of the speed ratio adjustment motor is continuously adjusted, continuously variable automatic transmission can also be achieved in an overgear range.

According to the principle formula $n_T+\alpha n_Q-(1+\alpha)n_H=0$ of the planetary gear mechanism, when the rotation speed of the gear ring 12 $n_Q=0$ and the rotation speed of the sun gear $n_T=n$, the planetary gear mechanism has the maximum reduction ratio which is $i_{max}=1+\alpha$. However, for the all-gear continuously variable automatic transmission and speed ratio active control system of the present disclosure, since the front end or the left end of the planetary gear mechanism III is connected to the torque proportional distribution differential mechanism I in series, when $n_Q=0$, the rotation speed of the sun gear 11 $n_T \neq n$ but $n_T=2n$.

$n_Q=0$, $n_T=2n$ are substituted into formula (1) to obtain the actual maximum speed ratio $$i_{b\,max} = \frac{1+\alpha}{2}$$

of the all-gear continuously variable automatic transmission and speed ratio active control system of the present disclosure, and the actual maximum speed ratio $i_{b\,max}$ of the all-gear continuously variable automatic transmission and speed ratio active control system of the disclosure is only ½ of the maximum speed ratio $i_{max}$ of the planetary gear mechanism.

It is known from the foregoing examples that when the gear ratio of the gear ring 12 to the sun gear 11 in the planetary gear mechanism III is $$\alpha = \frac{Z_Q}{Z_T} = 7,$$

and the actual maximum speed ratio of the all-gear continuously variable automatic transmission and speed ratio active control system of the present disclosure is $i_{b\,max}=4$. If a user wants to obtain a wider speed ratio change range, although the user can continue to increase the gear ratio α of the gear ring to the sun gear, the increase of α will inevitably lead to an increase in the radial size of the planetary gear mechanism, that is, the speed ratio change range of the all-gear continuously variable automatic transmission and speed ratio active control system of the present disclosure is limited by the gear ratio α of the gear ring to the sun gear, in order to break through the limit of the speed ratio change range and effectively obtain a required wider speed ratio change range, the following two effective methods can be adopted. (1) Two or more continuously variable automatic transmission and speed ratio active control systems of the present disclosure are connected in series for use so that a continuously variable automatic transmission and speed ratio active control system with the speed ratio change range of any size can be obtained. (2) A planetary gear mechanism with a speed reduction mechanism on a sun gear being the input end with a relatively small radial size specially invented for the present disclosure is adopted for replacing the planetary gear mechanism III shown in FIG. 1 to FIG. 5.

Figure 6:
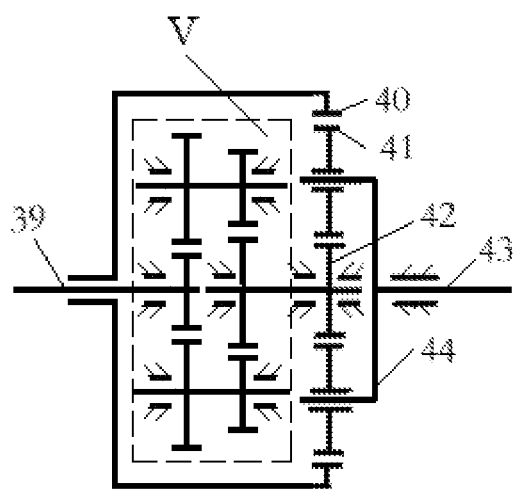
FIG. 6 is a structural schematic diagram of another embodiment of a planetary gear mechanism with a speed reduction mechanism on a sun gear being the input end.

The speed reduction mechanism V may be a symmetric fixed-shaft gear train gear reduction mechanism as shown in FIG. 6 or an asymmetric fixed-shaft gear train gear reduction mechanism or a planetary gear reduction mechanism. Two powers transmitted to the planetary gear mechanism are respectively transmitted to a gear ring 40 and to a sun gear 42 after being input through an input shaft and decelerated by the speed reduction mechanism V, and the powers are output through an output shaft 43 rigidly connected to a planetary carrier 44. If the planetary gear mechanism with the speed reduction mechanism on the sun gear being the input end is adopted to replace the planetary gear mechanism III in the all-gear continuously variable automatic transmission and speed ratio active control system of the present disclosure, the reduction ratio of the reduction mechanism V is set as $i_v$, the gear ratio of the gear ring to the sun gear is set as α and the rotation speed of the continuously variable automatic transmission device input shaft 1 is set as $n_i=n$, and if the rotation speed of the gear ring is $n_Q=0$, then the rotation speed of the sun gear is $$n_T = \frac{2n}{i_V}.$$

The aforementioned parameters are substituted into formula (1) to obtain the planetary carrier output rotation speed $$n_H = \frac{2}{(1+\alpha)i_V}n,$$

and the maximum speed ratio $i_{bV\ max}$ is:

$$i_{bV\ max} = \frac{n_i}{n_H} = \frac{n}{\frac{2n}{(1+\alpha)i_V}} = \frac{1}{2}(1+\alpha)i_V \qquad (19)$$

If the rotation speed of the gear ring is $n_Q=n$, then the rotation speed of the sun gear is $$n_T = \frac{n}{i_V},\ n_T = \frac{n}{i_V}$$

is substituted into formula (1) to obtain the planetary carrier output rotation speed $$n_H = \frac{1+\alpha i_V}{(1+\alpha)i_V}n,$$

and the minimum speed ratio $i_{bV\ min}$ is:

$$i_{bV\ min} = \frac{n_i}{n_H} = \frac{n}{\frac{1+\alpha i_V}{(1+\alpha)i_V}n} = \frac{(1+\alpha)i_V}{1+\alpha i_V} \qquad (20)$$

As a preferred embodiment of the reduction ratio, if the reduction ratio of the speed reduction mechanism V is $i_V=4$ and the gear ratio of the gear ring to the sun gear is $\alpha=5$, the parameters are substituted into formulas (19) and (20) respectively to obtain:

$$i_{bV\ max} = \frac{1}{2}(1+\alpha)i_V = \frac{1}{2}(1+5)\times 4 = 12$$

$$i_{bV\ min} = \frac{(1+\alpha)_V}{1+\alpha i_V} = \frac{(1+5)\times 4}{1+5\times 4} = 1.143$$

Although the gear ratio $\alpha$ of the gear ring to the sun gear is reduced from 7 to 5, the continuously variable automatic transmission range of the all-gear continuously variable automatic transmission and speed ratio active control system of the present disclosure is widened from the original 1~4 to 1.143~12. While the radial size of the present disclosure is greatly reduced, the continuously variable automatic transmission range is greatly widened to nearly three times the original range.

When powers of a power source are input to the continuously variable automatic transmission device input shaft 1 of the all-gear continuously variable automatic transmission and speed ratio active control system of the present disclosure, since a mechanical system is in a static state before, and resistance of working mechanisms or working machines (such as driving wheels of various vehicles, propellers of ships, spindles/cutter heads of machine tools, rotary tillers, hydraulic pumps, compressors and blowers) connected to an output shaft 14 of the all-gear continuously variable automatic transmission and speed ratio active control system of the present disclosure from static to motion is relatively large, the gear ring 12 in the planetary gear mechanism I is still in a static state, the all-gear continuously variable automatic transmission device has the maximum speed ratio (transmission ratio) at this time, which is very beneficial to startup operation of the working mechanisms or the working machines. As the output powers and rotation speed of the power source increase, the gear ring 12 starts to rotate, and the speed ratio (transmission ratio) of the all-gear continuously variable automatic transmission device changes with the change of the rotation speed of the gear ring 12, that is, automatic speed changing starts. Since the rotation speed of the gear ring 12 must be continuously changing and impossibly changes in a jumping mode, the speed ratio (transmission ratio) of the all-gear continuously variable automatic transmission device of the present disclosure must automatically and continuously vary in a stepless manner, that is, continuously variable automatic transmission is achieved. If the resistance of the working mechanisms or the working machines remains unchanged, and the powers output by the power source increase (or decrease), the speed ratio of the all-gear continuously variable automatic transmission device of the present disclosure decreases (or increases) accordingly, that is, when the resistance remains unchanged and the input powers increase (or decrease), the speed ratio of the all-gear continuously variable automatic transmission device decreases (or increases) as the powers increase (or decrease), and the rotation speed of the working mechanisms or the working machines synchronously increases (or decreases), so that a good acceleration (or deceleration) effect is achieved. If the powers output by the power source are unchanged, the resistance of the working mechanisms or the working machines increases (or decreases), the speed ratio of the all-gear continuously variable automatic transmission device of the present disclosure increases (or decreases) accordingly, and the all-gear continuously variable automatic transmission device outputs just higher (or lower) torque to offset the increased (or decreased) resistance of the working mechanisms or the working machines.

Speed ratio active control: in order to transcend the inherent automatic transmission law of the all-gear continuously variable automatic transmission device to better meet the requirements of actual use, a speed ratio active control mechanism II is additionally arranged on a hollow shaft 5 for connecting a first differential bevel gear 6 with the gear ring 12 and between the torque proportional distribution differential mechanism I and the planetary gear mechanism III. Since the first differential bevel gear 6 as a power output end of the torque proportional distribution differential mechanism I and the gear ring 12 in the planetary gear mechanism III, as well as a second differential bevel gear 7 as the other power output end of the torque proportional distribution differential mechanism I and the sun gear in the planetary gear mechanism III are always in a state of dynamic equilibrium, theoretically, it is very simple to change one of the two motions, and the motion speed can be adjusted at will only by inputting one motion to one of the two motions. Since the speed ratio accordingly changes automatically due to change to either of the two motions, in order to achieve speed ratio active control over and obtain a wider speed ratio change range, the speed ratio active control mechanism II composed of a speed ratio adjustment motor 8, a speed ratio adjustment driving gear 9 and a speed ratio adjustment driven gear 10 is additionally arranged at the first differential bevel gear shaft 5 used as a connecting shaft of the first differential bevel gear 6 and the gear ring 12. Continuously variable automatic transmission between the maximum speed ratio and the minimum speed ratio can be achieved as required by adjusting the rotation speed of the speed ratio adjustment motor 8 according to actual needs.

Figure 7:
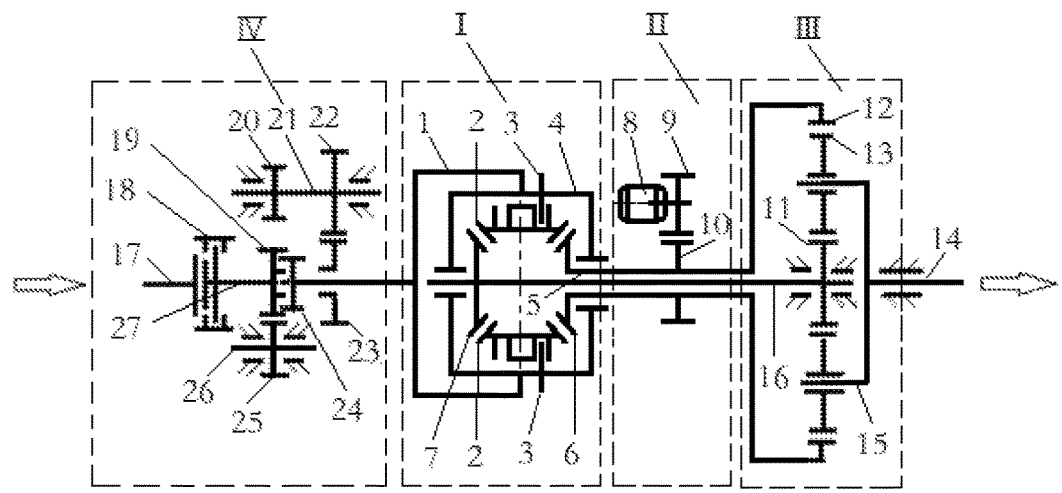
FIG. 7 is a structural schematic diagram in a forward gear state (three implementation modes of a reversing mechanism).
Figure 7:
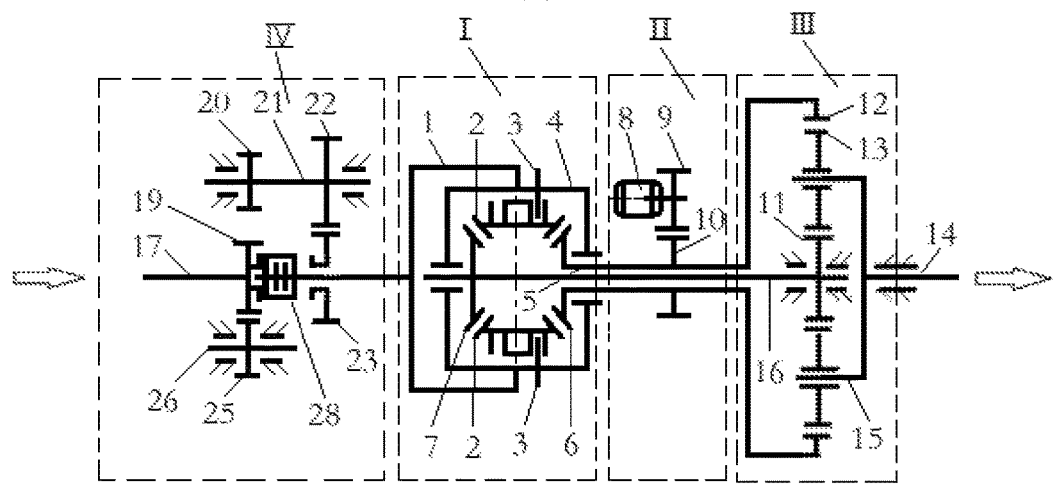
Figure 7:
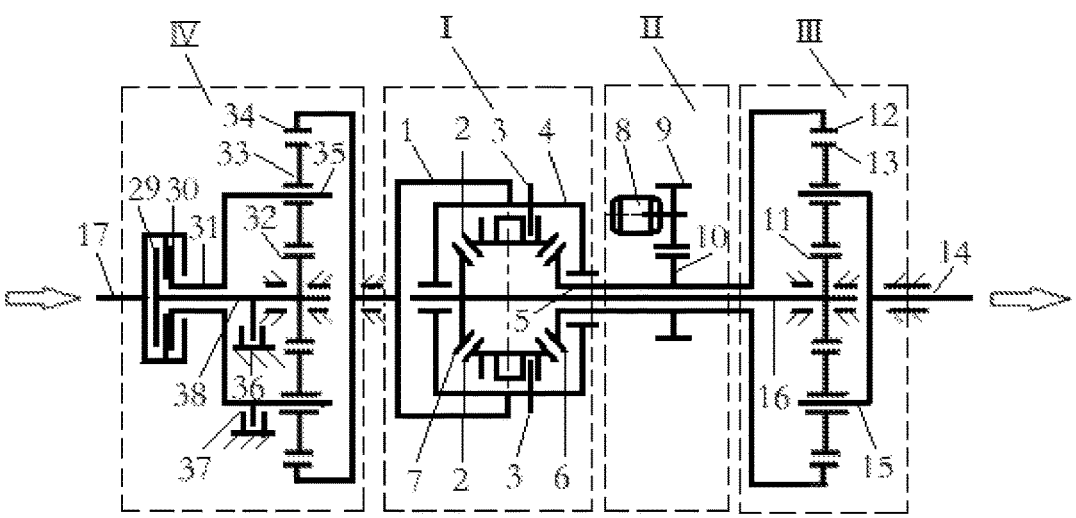
Figure 8:
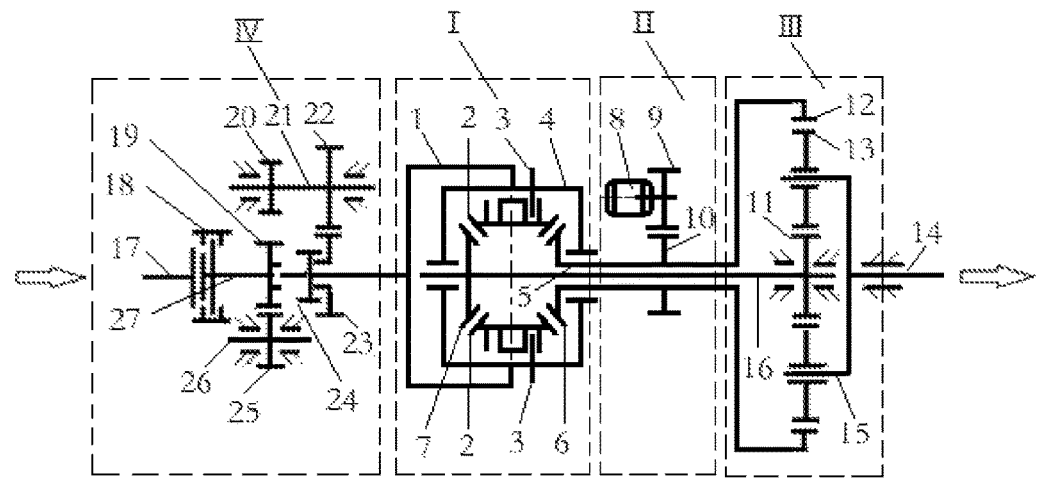
FIG. 8 is a structural schematic diagram in a reverse gear state (three implementation modes of a reversing mechanism).
Figure 8:
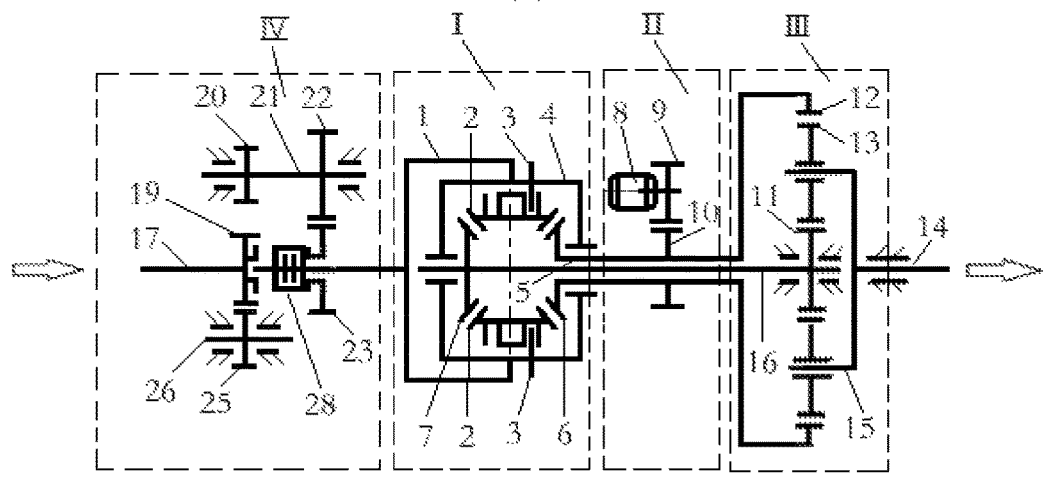
Figure 8:
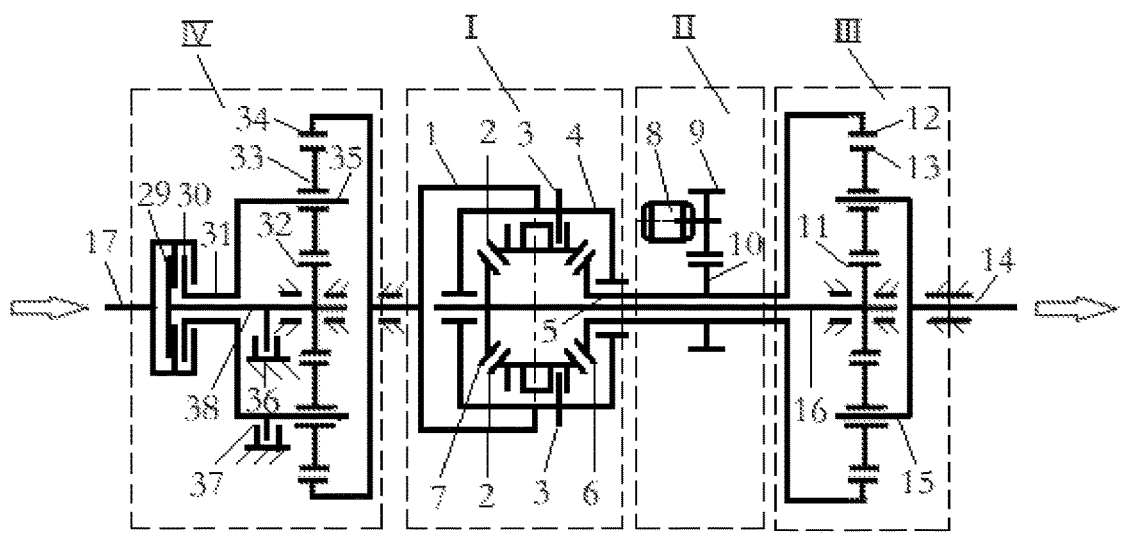

The working process of the all-gear continuously variable automatic transmission and speed ratio active control system is described as follows. The all-gear continuously variable automatic transmission and speed ratio active control system of the present disclosure with the functions of continuously variable automatic transmission and forward rotation, reverse rotation and neutral gear free switching is formed by connecting the reversing mechanism shown in FIG. 5 with the continuously variable automatic transmission device with speed ratio active control shown in FIG. 1 in series, referring to FIG. 4. In engineering, the forward rotation of a transmission is often referred to as the forward gear. The reverse rotation of the transmission is often referred to as the reverse gear. The power transmission interruption is referred to as the neutral gear. The reversing mechanism and the continuously variable automatic transmission device can be connected in series in the following two connection modes, namely: the reversing mechanism is connected to the front end (or the input end) of the continuously variable automatic transmission device in series or the reversing mechanism is connected to the rear end (or the output end) of the continuously variable automatic transmission device in series. By connecting the reversing mechanism at the front end (or the input end) of the continuously variable automatic transmission device, a good weight reduction effect can be achieved, only the structure scheme that the reversing mechanism is connected to the front end (or the input end) of the continuously variable automatic transmission device in series is taken as an example herein, and the process and principle of switching the forward gear, the reverse gear and the neutral gear of the all-gear continuously variable automatic transmission and speed ratio active control system of the present disclosure are introduced with reference to FIGS. 7-9.

All-gear continuously variable automatic transmission and speed ratio active control system with a clutch-synchronizer reversing mechanism is described below.

Forward gear: a shift lever is put in a D gear position, and a control system of the all-gear continuously variable automatic transmission and speed ratio active control system performs the following operations. The clutch 18 is disengaged, the synchronizer 24 moves to the leftmost end, thus a synchronizer engaging sleeve is engaged with engaging teeth on the right side of the input shaft gear 19 (see (a) of FIG. 7), the clutch 18 is engaged, and power and motion are transmitted to a reversing input shaft 27, the synchronizer 24, the continuously variable automatic transmission device input shaft 1, the differential case 4, the planetary bevel gear shafts 3, the planetary bevel gears 2, the differential bevel gears 6 and 7, the gear ring 12 and the sun gear 11 (power and motion are divided by the torque proportional distribution differential mechanism I into two parts which are respectively transmitted to the gear ring 12 and the sun gear 11 of the planetary gear mechanism III through the differential bevel gears 6 and 7), the planetary carrier 15 and the continuously variable automatic transmission device output shaft 14 through the clutch 18. If automatic transmission (adjustment of the speed ratio) needs to be performed according to the actual use requirements, the speed ratio adjustment motor 8 of the speed ratio active control system needs to be started, and the speed ratio active control can be achieved by adjusting the rotation speed of the speed ratio adjustment motor 8 according to the required demands.

Reverse gear: the shift lever is put in an R gear position, and the control system of the all-gear continuously variable automatic transmission and speed ratio active control system performs the following operations. The speed ratio adjustment motor 8 is stationary and does not rotate, the clutch 18 is disengaged, the synchronizer 24 moves to the rightmost end, thus the synchronizer engaging sleeve is engaged with engaging teeth on the left side of the reversing driven gear 23 (see (a) of FIG. 8), the clutch 18 is engaged, and power and motion are transmitted to the reversing input shaft 27, an input shaft gear 19, the reversing driving gear 25, an idle gear 20, an idle gear shaft 21, an idle gear 22, a reversing driven gear 23, a synchronizer 24, the continuously variable automatic transmission device input shaft 1, the differential case 4, the planetary bevel gear shafts 3, the planetary bevel gears 2, the differential bevel gears 6 and 7, the gear ring 12 and the sun gear 11 (power and motion are divided by the torque proportional distribution differential mechanism into two parts which are respectively transmitted to the gear ring 12 and the sun gear 11 of the planetary gear mechanism III through the differential bevel gears 6 and 7), the planetary carrier 15 and the continuously variable automatic transmission device output shaft 14 through the clutch 18.

Figure 9:
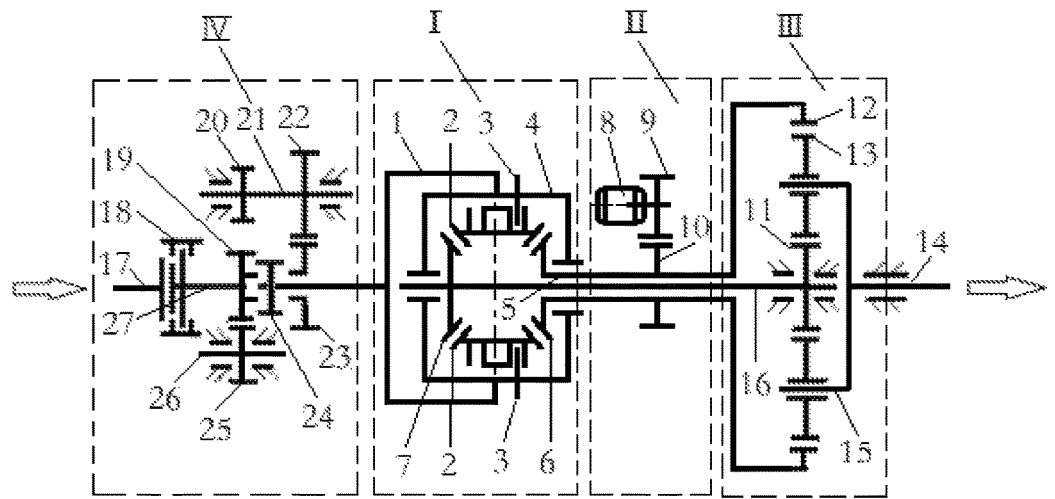
FIG. 9 is a structural schematic diagram in a neutral gear state (three implementation modes of a reversing mechanism).
Figure 9:
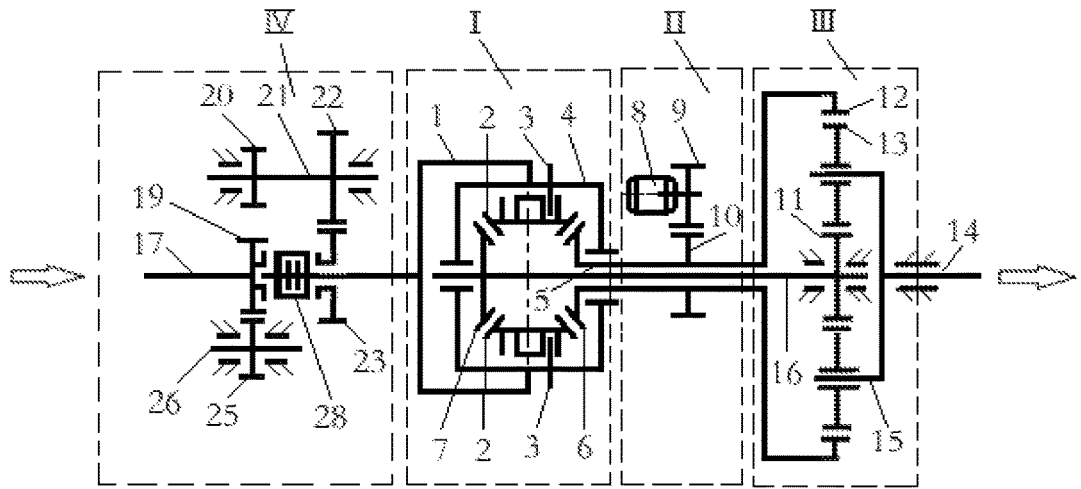
Figure 9:
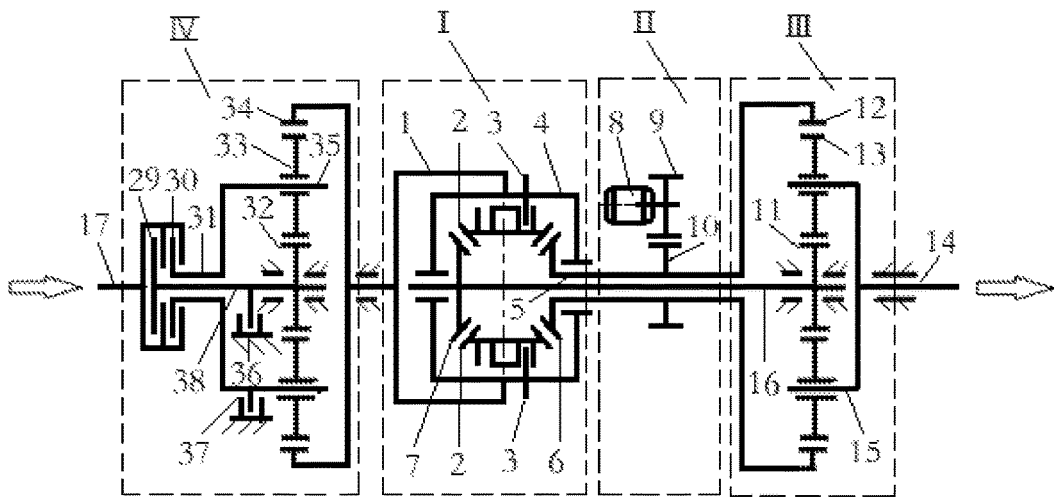

Neutral gear: the shift lever is put in an N gear position, the clutch 18 is disengaged, and the synchronizer 24 is shifted to the middle position (the position shown in (a) of FIG. 9), and the synchronizer 24 is engaged.

All-gear continuously variable automatic transmission and speed ratio active control system with a duplex multi-plate clutch reversing mechanism is described below.

Forward gear: the shift lever is put in the D gear position, and the control system of the all-gear continuously variable automatic transmission and speed ratio active control system performs the following operations. A left clutch of the duplex multi-plate clutch 28 is engaged, a right clutch of the duplex multi-plate clutch 28 is disengaged, an input shaft gear 19 is fixedly connected to the continuously variable automatic transmission device input shaft 1 by the duplex multi-plate clutch 28 (see (b) of FIG. 7), and power and motion are transmitted to the duplex multi-plate clutch 28, the continuously variable automatic transmission device input shaft 1, the differential case 4, the planetary bevel gear shafts 3, the planetary bevel gears 2, the differential bevel gears 6 and 7, the gear ring 12 and the sun gear 11 (power and motion are divided by the torque proportional distribution differential mechanism into two parts which are respectively transmitted to the gear ring 12 and the sun gear 11 of the planetary gear mechanism III through the differential bevel gears 6 and 7), the planetary carrier 15 and the continuously variable automatic transmission device output shaft 14 through a clutch input shaft 17. If automatic transmission (adjustment of the speed ratio) needs to be performed according to the actual use requirements, the speed ratio adjustment motor 8 of the speed ratio active control system needs to be started, and the speed ratio active control can be achieved by adjusting the rotation speed of the speed ratio adjustment motor 8 according to the required demands.

Reverse gear: the shift lever is put in the R gear position, and the control system of the all-gear continuously variable automatic transmission and speed ratio active control system performs the following operations. The speed ratio adjustment motor is stationary and does not rotate, the right clutch of the duplex multi-plate clutch 28 is engaged, the left clutch of the duplex multi-plate clutch 28 is disengaged, the reversing driven gear 23 is fixedly connected to the continuously variable automatic transmission device input shaft 1 by the duplex multi-plate clutch 28 (see (b) of FIG. 8), and power and motion are transmitted to the reversing driving gear 25, the idle gear 20, the idle gear shaft 21, the idle gear 22, the reversing driven gear 23, the clutch 28, the continuously variable automatic transmission device input shaft 1, the differential case 4, the planetary bevel gear shafts 3, the planetary bevel gears 2, the differential bevel gears 6 and 7, the gear ring 12 and the sun gear 11 (power and motion are divided by the torque proportional distribution differential mechanism into two parts which are respectively transmitted to the gear ring 12 and the sun gear 11 of the planetary gear mechanism III through the differential bevel gears 6 and 7), the planetary carrier 15 and the continuously variable automatic transmission device output shaft 14 through the clutch input shaft 17.

Neutral gear: the shift lever is put in the N gear position, and the duplex multi-plate clutch 28 is disengaged (see (b) of FIG. 9).

All-gear continuously variable automatic transmission and speed ratio active control system with a dual-clutch reversing mechanism is described below.

Forward gear: the shift lever is put in the D gear position, the control system of the all-gear continuously variable automatic transmission and speed ratio active control system performs the following operations. A forward gear clutch 30 of two clutches is engaged, a reverse gear clutch 29 of the two clutches is disengaged, a sun gear lock 36 is unlocked, and a gear ring lock 37 is locked (see (c) of FIG. 7), and power and motion are transmitted to the forward gear clutch 30, a forward gear input shaft 31, a reversing mechanism sun gear 32, a reversing mechanism planetary gear 34, a reversing mechanism planetary carrier 35, the continuously variable automatic transmission device input shaft 1, a differential case 4, planetary bevel gear shafts 3, planetary bevel gears 2, differential bevel gears 6 and 7, the gear ring 12 and the sun gear 11 (power and motion are divided by the torque proportional distribution differential mechanism into two parts which are respectively transmitted to the gear ring 12 and the sun gear 11 of the planetary gear mechanism III through the differential bevel gears 6 and 7), the planetary carrier 15 and the continuously variable automatic transmission device output shaft 14 through the clutch input shaft 17. If automatic speed changing (adjustment of the speed ratio) needs to be performed according to the actual use requirements, the speed ratio adjustment motor 8 of the speed ratio active control system needs to be started, and the speed ratio active control can be achieved by adjusting the rotation speed of the speed ratio adjustment motor 8 according to the required demands.

Reverse gear: the shift lever is put in the R gear position, the control system of the all-gear continuously variable automatic transmission and speed ratio active control system performs the following operations. The speed ratio adjustment motor 8 is stationary and does not rotate, the reverse gear clutch 29 of the two clutches is engaged, the forward gear clutch 30 of the two clutches is disengaged, the gear ring lock 37 is unlocked, and the sun gear lock 36 is locked (see (c) of FIG. 8), and power and motion are transmitted to the reverse gear clutch 29, a reversing input shaft 38, a reversing mechanism gear ring 33, the reversing mechanism planetary gear 34, the reversing mechanism planetary carrier 35, the continuously variable automatic transmission device input shaft 1, the differential case 4, the planetary bevel gear shafts 3, the planetary bevel gears 2, the differential bevel gears 6 and 7, the gear ring 12 and the sun gear 11 (power and motion are divided by the torque proportional distribution differential mechanism into two parts which are respectively transmitted to the gear ring 12 and the sun gear 11 of the planetary gear mechanism III through the differential bevel gears 6 and 7), the planetary carrier 15 and the continuously variable automatic transmission device output shaft 14 through the clutch input shaft 17.

Neutral gear: the shift lever is put in the N gear position, and the forward gear clutch 30 and the reverse gear clutch 29 of the two clutches are both disengaged (see (c) of FIG. 9).

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An all-gear continuously variable automatic transmission and speed ratio active control system, comprising a torque proportional distribution differential mechanism, a speed ratio active control mechanism and a planetary gear mechanism; the torque proportional distribution differential mechanism is connected to a front end of the planetary gear mechanism in series to form a continuously variable automatic transmission device together with the planetary gear mechanism; the speed ratio active control mechanism is arranged between the torque proportional distribution differential mechanism and the planetary gear mechanism; the torque proportional distribution differential mechanism comprises a first differential bevel gear and a second differential bevel gear arranged at power and motion output ends; the first differential bevel gear is rigidly connected to a gear ring of the planetary gear mechanism by a hollow first differential bevel gear shaft; a second differential bevel gear shaft penetrates through the hollow first differential bevel gear shaft; and the second differential bevel gear is connected to a sun gear of the planetary gear mechanism by the second differential bevel gear shaft;

the speed ratio active control mechanism comprises a speed ratio adjustment motor, a speed ratio adjustment driving gear and a speed ratio adjustment driven gear, wherein the speed ratio adjustment driving gear and the speed ratio adjustment driven gear are in a normally engaged state; the speed ratio adjustment driven gear is rigidly connected to the first differential bevel gear shaft; and the speed ratio adjustment driving gear is installed on an output shaft of the speed ratio adjustment motor; and two input ends of the planetary gear mechanism are the sun gear at a center and an outermost gear ring respectively, and planetary gears are engaged with the sun gear and the gear ring simultaneously and output power by a planetary carrier.

2. The all-gear continuously variable automatic transmission and speed ratio active control system according to claim 1, wherein the torque proportional distribution differential mechanism comprises a differential case, planetary bevel gears, the first differential bevel gear and the second differential bevel gear; a continuously variable automatic transmission device input shaft is rigidly connected to the differential case at a front end of the differential case; the first differential bevel gear and the second differential bevel gear are both rotatably supported in shaft holes extending in a front end-rear end direction or a left-right direction of the differential case; the second differential bevel gear and the first differential bevel gear are engaged with the planetary bevel gears at a front end and a rear end correspondingly; a front end of the first differential bevel gear shaft is rigidly connected to the first differential bevel gear, and a rear end of the first differential bevel gear shaft penetrates through the differential case and is rigidly connected to the gear ring of the planetary gear mechanism; a front end of the second differential bevel gear shaft is rigidly connected to the second differential bevel gear; and a rear end of the second differential bevel gear shaft penetrates through the hollow first differential bevel gear shaft and is rigidly connected to the sun gear or forms an integrated structure with a sun gear shaft.

3. The all-gear continuously variable automatic transmission and speed ratio active control system according to claim 2, wherein the planetary bevel gears are provided with circumferential annular grooves around centerlines of planetary bevel gear shafts, one end of each planetary bevel gear shaft is fixedly installed on the differential case, and the other end of each planetary bevel gear shaft is installed in the corresponding annular groove by a bearing; and rotation centers of the planetary bevel gears during rotation are center arc lines of the annular grooves.

4. The all-gear continuously variable automatic transmission and speed ratio active control system according to claim 3, wherein when the planetary bevel gears rotate, a distance between a first engaging point of each planetary bevel gear and the second differential bevel gear and the centerline of the corresponding planetary bevel gear shaft is set as S1, a distance between a second engaging point of each planetary bevel gear and the first differential bevel gear and the centerline of the corresponding planetary bevel gear shaft is set as S2, and a ratio of S1 to S2 is always a set ratio.

5. The all-gear continuously variable automatic transmission and speed ratio active control system according to claim 4, wherein two or more all-gear continuously variable automatic transmission and speed ratio active control systems are connected in series to widen a speed ratio change range of the all-gear continuously variable automatic transmission and speed ratio active control system, or a speed reduction mechanism is arranged in front of the sun gear in the planetary gear mechanism to widen a speed ratio change range of the all-gear continuously variable automatic transmission and speed ratio active control system; the speed reduction mechanism is one of a symmetric fixed-shaft gear train gear reduction mechanism, an asymmetric fixed-shaft gear train gear reduction mechanism and a planetary gear reduction mechanism; the second differential bevel gear shaft is connected to the sun gear after being decelerated by the speed reduction mechanism; and the speed reduction mechanism is connected in front of the sun gear in series.

6. The all-gear continuously variable automatic transmission and speed ratio active control system according to claim 3, wherein at least two planetary bevel gears are adopted by the torque proportional distribution differential mechanism.

7. The all-gear continuously variable automatic transmission and speed ratio active control system according to claim 6, wherein two or more all-gear continuously variable automatic transmission and speed ratio active control systems are connected in series to widen a speed ratio change range of the all-gear continuously variable automatic transmission and speed ratio active control system, or a speed reduction mechanism is arranged in front of the sun gear in the planetary gear mechanism to widen a speed ratio change range of the all-gear continuously variable automatic transmission and speed ratio active control system; the speed reduction mechanism is one of a symmetric fixed-shaft gear train gear reduction mechanism, an asymmetric fixed-shaft gear train gear reduction mechanism and a planetary gear reduction mechanism; the second differential bevel gear shaft is connected to the sun gear after being decelerated by the speed reduction mechanism; and the speed reduction mechanism is connected in front of the sun gear in series.

8. The all-gear continuously variable automatic transmission and speed ratio active control system according to claim 2, wherein two or more all-gear continuously variable automatic transmission and speed ratio active control systems are connected in series to widen a speed ratio change range of the all-gear continuously variable automatic transmission and speed ratio active control system, or a speed reduction mechanism is arranged in front of the sun gear in the planetary gear mechanism to widen a speed ratio change range of the all-gear continuously variable automatic transmission and speed ratio active control system; the speed reduction mechanism is one of a symmetric fixed-shaft gear train gear reduction mechanism, an asymmetric fixed-shaft gear train gear reduction mechanism and a planetary gear reduction mechanism; the second differential bevel gear shaft is connected to the sun gear after being decelerated by the speed reduction mechanism; and the speed reduction mechanism is connected in front of the sun gear in series.

9. The all-gear continuously variable automatic transmission and speed ratio active control system according to claim 2, wherein a front end or a rear end of the continuously variable automatic transmission device is connected to a reversing mechanism in series to achieve switching of at least three modes of forward rotation, reverse rotation and interruption of power and motion transmission; and the reversing mechanism is a reversing mechanism integrating a clutch with a synchronizer, or a duplex multi-plate clutch reversing mechanism or a dual-clutch reversing mechanism.

10. The all-gear continuously variable automatic transmission and speed ratio active control system according to claim 9, wherein when the reversing mechanism integrating the clutch with the synchronizer is adopted, a clutch input shaft and a transmission input shaft are arranged in a straight line, an input shaft gear is arranged on the clutch input shaft, and a left end or a front end of the continuously variable transmission device input shaft is installed in a bearing seat hole at a right end of the input shaft gear by a bearing; a reversing driving gear is normally engaged with the input shaft gear and is normally engaged with a front set of idle gears; a rear set of idle gears is coaxial with the front set of idle gears, and both the sets of idle gears are rigidly connected to an idle gear shaft; the rear set of idle gears is normally engaged with a reversing driven gear; the reversing driven gear hollowly sleeves the continuously variable automatic transmission device input shaft by a needle bearing or a sliding bearing; and a lock ring or lock pin type synchronizer is installed between the input shaft gear and the reversing driven gear;

when the duplex multi-plate clutch reversing mechanism is adopted, the input shaft gear is arranged on the clutch input shaft, the reversing driven gear hollowly sleeves the continuously variable automatic transmission device input shaft by a needle bearing or a sliding bearing, and a duplex multi-plate clutch is installed between the input shaft gear and the reversing driven gear; the left end or the front end of the continuously variable automatic transmission device input shaft is installed in the bearing seat hole at the right end of the clutch input shaft gear by the bearing; the reversing driving gear is normally engaged with the input shaft gear and also normally engaged with idle gears; the front and rear sets of idle gears are rigidly connected to the idle gear shaft; and the idle gear at the rear end is normally engaged with the reversing driven gear; and when the dual-clutch reversing mechanism is adopted, the dual-clutch reversing mechanism is composed of two clutches and a planetary gear mechanism with a locking mechanism, the two clutches are composed of a forward gear clutch and a reverse gear clutch; the forward gear clutch is rigidly connected to a reversing mechanism planetary carrier by a hollow forward gear input shaft; the reverse gear clutch is rigidly connected to a reversing mechanism sun gear by a reverse gear input shaft penetrating through a center of the forward gear input shaft, and a reversing mechanism gear ring and the left end or the front end of the continuously variable automatic transmission device input shaft are rigidly connected to transmit power and motion to the torque proportional distribution differential mechanism; and a sun gear lock and a planetary carrier lock are installed on the reverse gear input shaft and the reversing mechanism planetary carrier respectively.

11. The all-gear continuously variable automatic transmission and speed ratio active control system according to claim 1, wherein at least two planetary gears are arranged in the planetary gear mechanism.

12. The all-gear continuously variable automatic transmission and speed ratio active control system according to claim 11, wherein two or more all-gear continuously variable automatic transmission and speed ratio active control systems are connected in series to widen a speed ratio change range of the all-gear continuously variable automatic transmission and speed ratio active control system, or a speed reduction mechanism is arranged in front of the sun gear in the planetary gear mechanism to widen a speed ratio change range of the all-gear continuously variable automatic transmission and speed ratio active control system; the speed reduction mechanism is one of a symmetric fixed-shaft gear train gear reduction mechanism, an asymmetric fixed-shaft gear train gear reduction mechanism and a planetary gear reduction mechanism; the second differential bevel gear shaft is connected to the sun gear after being decelerated by the speed reduction mechanism; and the speed reduction mechanism is connected in front of the sun gear in series.

13. The all-gear continuously variable automatic transmission and speed ratio active control system according to claim 1, wherein two or more all-gear continuously variable automatic transmission and speed ratio active control systems are connected in series to widen a speed ratio change range of the all-gear continuously variable automatic transmission and speed ratio active control system, or a speed reduction mechanism is arranged in front of the sun gear in the planetary gear mechanism to widen a speed ratio change range of the all-gear continuously variable automatic transmission and speed ratio active control system; the speed reduction mechanism is one of a symmetric fixed-shaft gear train gear reduction mechanism, an asymmetric fixed-shaft gear train gear reduction mechanism and a planetary gear reduction mechanism; the second differential bevel gear shaft is connected to the sun gear after being decelerated by the speed reduction mechanism; and the speed reduction mechanism is connected in front of the sun gear in series.

14. The all-gear continuously variable automatic transmission and speed ratio active control system according to claim 1, wherein a front end or a rear end of the continuously variable automatic transmission device is connected to a reversing mechanism in series to achieve switching of at least three modes of forward rotation, reverse rotation and interruption of power and motion transmission; and the reversing mechanism is a reversing mechanism integrating a clutch with a synchronizer, or a duplex multi-plate clutch reversing mechanism or a dual-clutch reversing mechanism.

15. The all-gear continuously variable automatic transmission and speed ratio active control system according to claim 14, wherein when the reversing mechanism integrating the clutch with the synchronizer is adopted, a clutch input shaft and a transmission input shaft are arranged in a straight line, an input shaft gear is arranged on the clutch input shaft, and a left end or a front end of the continuously variable transmission device input shaft is installed in a bearing seat hole at a right end of the input shaft gear by a bearing; a reversing driving gear is normally engaged with the input shaft gear and is normally engaged with a front set of idle gears; a rear set of idle gears is coaxial with the front set of idle gears, and both the sets of idle gears are rigidly connected to an idle gear shaft; the rear set of idle gears is normally engaged with a reversing driven gear; the reversing driven gear hollowly sleeves the continuously variable automatic transmission device input shaft by a needle bearing or a sliding bearing; and a lock ring or lock pin type synchronizer is installed between the input shaft gear and the reversing driven gear;

when the duplex multi-plate clutch reversing mechanism is adopted, the input shaft gear is arranged on the clutch input shaft, the reversing driven gear hollowly sleeves the continuously variable automatic transmission device input shaft by a needle bearing or a sliding bearing, and a duplex multi-plate clutch is installed between the input shaft gear and the reversing driven gear; the left end or the front end of the continuously variable automatic transmission device input shaft is installed in the bearing seat hole at the right end of the clutch input shaft gear by the bearing; the reversing driving gear is normally engaged with the input shaft gear and also normally engaged with idle gears; the front and rear sets of idle gears are rigidly connected to the idle gear shaft; and the idle gear at the rear end is normally engaged with the reversing driven gear; and when the dual-clutch reversing mechanism is adopted, the dual-clutch reversing mechanism is composed of two clutches and a planetary gear mechanism with a locking mechanism, the two clutches are composed of a forward gear clutch and a reverse gear clutch; the forward gear clutch is rigidly connected to a reversing mechanism planetary carrier by a hollow forward gear input shaft; the reverse gear clutch is rigidly connected to a reversing mechanism sun gear by a reverse gear input shaft penetrating through a center of the forward gear input shaft, and a reversing mechanism gear ring and the left end or the front end of the continuously variable automatic transmission device input shaft are rigidly connected to transmit power and motion to the torque proportional distribution differential mechanism; and a sun gear lock and a planetary carrier lock are installed on the reverse gear input shaft and the reversing mechanism planetary carrier respectively.

\* \* \* \* \*